(12) United States Patent
Aiba et al.

(10) Patent No.: US 10,181,933 B2
(45) Date of Patent: Jan. 15, 2019

(54) MOBILE COMMUNICATION SYSTEM, BASE STATION APPARATUS, AND MOBILE STATION APPARATUS

(71) Applicant: Huawei Technologies Co., Ltd., Shenzhen (CN)

(72) Inventors: Tatsushi Aiba, Osaka (JP); Shohei Yamada, Osaka (JP)

(73) Assignee: Huawei Technologies Co., Ltd, Shenzhen (CN)

( * ) Notice: Subject to any disclaimer, the term of this patent is extended or adjusted under 35 U.S.C. 154(b) by 48 days.

(21) Appl. No.: 14/881,897

(22) Filed: Oct. 13, 2015

(65) Prior Publication Data
US 2016/0050058 A1 Feb. 18, 2016

Related U.S. Application Data

(63) Continuation of application No. 13/359,294, filed on Jan. 26, 2012, now Pat. No. 9,191,149, which is a
(Continued)

(30) Foreign Application Priority Data

Jul. 6, 2007 (JP) ................................ 2007-178728
Sep. 14, 2007 (JP) ................................ 2007-240049

(51) Int. Cl.
*H04L 5/00* (2006.01)
*H04W 72/04* (2009.01)
(Continued)

(52) U.S. Cl.
CPC .......... *H04L 5/0048* (2013.01); *H04L 1/0025* (2013.01); *H04L 1/0026* (2013.01);
(Continued)

(58) Field of Classification Search
CPC ... H04L 5/0048; H04L 5/0055; H04L 1/0026; H04L 1/0027; H04L 1/1664;
(Continued)

(56) References Cited

U.S. PATENT DOCUMENTS 6,993,294 B2   1/2006   Nobukiyo et al.
7,295,538 B2   11/2007  Aizawa et al.
(Continued)

FOREIGN PATENT DOCUMENTS

CN    1422032 A    6/2003
CN    1819677 A    8/2006
(Continued)

OTHER PUBLICATIONS

3rd Generation Partnership Project; Technical Specification Group Radio Access Network; Physical Channels and Modulation (Release 8), 3GPP TS 36.211, V1.1.0, May 2007, 34 pages.
(Continued)

*Primary Examiner* — Ivan O Latorre
(74) *Attorney, Agent, or Firm* — Slater Matsil, LLP

(57) ABSTRACT

The amount of control information is reduced for specifying the transmission method for simultaneously transmitting the uplink data and the reception quality information as well as the uplink data and the ACK/NACK. In a mobile communication system where the base station apparatus allocates, to the mobile station apparatus, resources wherein the base station apparatus transmits, to the mobile station apparatus, control information for specifying a transmission format for the mobile station apparatus to transmit information using the uplink, while the mobile station apparatus simultaneously transmits, to the base station apparatus, the uplink data and the reception quality information based on the specified transmission format in case of having received the control information from the base station apparatus.

15 Claims, 14 Drawing Sheets

Related U.S. Application Data continuation of application No. 12/667,833, filed as application No. PCT/JP2008/062108 on Jul. 3, 2008, now abandoned.

(51) Int. Cl.
  *H04L 1/00* (2006.01)
  *H04L 1/16* (2006.01)
  *H04W 72/12* (2009.01)
  *H04W 28/04* (2009.01)

(52) U.S. Cl.
  CPC .......... *H04L 1/0027* (2013.01); *H04L 1/1664* (2013.01); *H04L 1/1685* (2013.01); *H04L 5/0055* (2013.01); *H04W 72/04* (2013.01); *H04W 72/0413* (2013.01); *H04W 72/1278* (2013.01); *H04W 72/1289* (2013.01); *H04W 28/04* (2013.01)

(58) Field of Classification Search
  CPC ............... H04L 1/1685; H04L 1/0025; H04W 72/0413; H04W 72/1278; H04W 72/04; H04W 72/1289; H04W 28/04
  USPC ....... 370/310, 328, 329, 330, 332, 336, 343, 370/345, 348, 431, 436, 464, 478, 481, 370/498
  See application file for complete search history.

(56) References Cited

U.S. PATENT DOCUMENTS

| | | |
|---|---|---|
| 7,457,588 B2 | 11/2008 | Love et al. |
| 8,014,352 B2 | 9/2011 | Tiirola et al. |
| 8,095,141 B2 | 1/2012 | Teague |
| 2002/0097697 A1* | 7/2002 | Bae ................ H04B 7/264 370/335 |
| 2003/0045288 A1 | 3/2003 | Luschi et al. |
| 2003/0096631 A1 | 5/2003 | Kayama et al. |
| 2003/0139186 A1 | 7/2003 | Igarashi et al. |
| 2003/0142656 A1 | 7/2003 | Padovani et al. |
| 2004/0097240 A1 | 5/2004 | Chen et al. |
| 2004/0218567 A1* | 11/2004 | Budka ............... H04L 1/0003 370/332 |
| 2004/0224697 A1 | 11/2004 | Hakkinen et al. |
| 2004/0266469 A1 | 12/2004 | Hayashi et al. |
| 2005/0085236 A1 | 4/2005 | Gerlach et al. |
| 2006/0002339 A1 | 1/2006 | Niwano |
| 2006/0034216 A1 | 2/2006 | Kim et al. |
| 2006/0058054 A1* | 3/2006 | Hiramatsu ............ H04W 52/40 455/522 |
| 2006/0116080 A1 | 6/2006 | Eom |
| 2006/0133533 A1* | 6/2006 | Khandekar .......... H04L 1/0025 375/279 |
| 2006/0176856 A1 | 8/2006 | Yang et al. |
| 2006/0205414 A1 | 9/2006 | Teague |
| 2006/0262871 A1* | 11/2006 | Cho .................. H04L 5/0044 375/260 |
| 2006/0264220 A1 | 11/2006 | Chen et al. |
| 2006/0274706 A1 | 12/2006 | Chen et al. |
| 2007/0025300 A1 | 2/2007 | Terry et al. |
| 2007/0060178 A1 | 3/2007 | Gorokhov et al. |
| 2007/0097927 A1 | 5/2007 | Gorokhov et al. |
| 2007/0171849 A1 | 7/2007 | Zhang et al. |
| 2007/0206531 A1 | 9/2007 | Pajukoski et al. |
| 2007/0206534 A1 | 9/2007 | Kwun et al. |
| 2007/0207810 A1 | 9/2007 | Cho et al. |
| 2007/0211667 A1 | 9/2007 | Agrawal et al. |
| 2007/0211668 A1 | 9/2007 | Agrawal et al. |
| 2007/0265017 A1 | 11/2007 | Ishii et al. |
| 2008/0051098 A1 | 2/2008 | Rao |
| 2008/0072269 A1 | 3/2008 | Malladi et al. |
| 2008/0080423 A1 | 4/2008 | Kolding et al. |
| 2008/0095040 A1 | 4/2008 | Kwon et al. |
| 2008/0151829 A1 | 6/2008 | Khandekar |
| 2008/0188235 A1 | 8/2008 | Kim et al. |
| 2008/0207150 A1* | 8/2008 | Malladi ................ H04W 52/08 455/127.1 |
| 2008/0225788 A1 | 9/2008 | Inoue et al. |
| 2008/0225791 A1 | 9/2008 | Pi et al. |
| 2008/0233964 A1* | 9/2008 | McCoy ............. H04W 72/1284 455/450 |
| 2008/0287138 A1* | 11/2008 | Yoon .................. H04W 72/085 455/452.2 |
| 2008/0293424 A1 | 11/2008 | Cho et al. |
| 2008/0298477 A1* | 12/2008 | Classon ............... H04L 5/0007 375/260 |
| 2008/0311919 A1* | 12/2008 | Whinnett .............. H04L 1/0027 455/447 |
| 2009/0097466 A1 | 4/2009 | Lee et al. |
| 2009/0201826 A1 | 8/2009 | Gorokhov et al. |
| 2009/0201872 A1 | 8/2009 | Gorokhov et al. |
| 2009/0270094 A1 | 10/2009 | Ito et al. |
| 2009/0303937 A1 | 12/2009 | Sawahashi et al. |
| 2009/0323641 A1 | 12/2009 | Futagi et al. |
| 2009/0325505 A1* | 12/2009 | Aiba ..................... H04L 1/0001 455/67.13 |
| 2010/0027450 A1* | 2/2010 | Montojo ............... H04L 1/0017 370/311 |
| 2010/0128692 A1 | 5/2010 | Aiba et al. |
| 2010/0157836 A1 | 6/2010 | Aiba et al. |
| 2011/0255518 A9 | 10/2011 | Agrawal et al. |
| 2012/0134337 A1 | 5/2012 | Aiba et al. |
| 2013/0178221 A1 | 7/2013 | Jung et al. |

FOREIGN PATENT DOCUMENTS

| | | |
|---|---|---|
| EP | 1389848 A1 | 2/2004 |
| EP | 1526674 A1 | 4/2005 |
| EP | 1780926 A1 | 5/2007 |
| EP | 1526674 B1 | 8/2007 |
| EP | 1892987 A1 | 2/2008 |
| JP | 2005130491 A | 5/2005 |
| JP | 2007243898 A | 9/2007 |
| KR | 20050078636 A | 8/2005 |
| KR | 20050078640 A | 8/2005 |
| WO | 2006134946 A1 | 12/2006 |
| WO | 2007024936 A2 | 3/2007 |

OTHER PUBLICATIONS

3rd Generation Partnership Project; Technical Specification Group Radio Access Network; Multiplexing and channel coding (Release 8), 3GPP TS 36.212, V1.2.0, May 2007, 15 pages.

3rd Generation Partnership Project; Technical Specificatino Group Radio Access Network; Physical layer procedures (Release 8), 3GPP TS 36.213, V1.2.0, May 2007, 10 pages.

"Introduction of Fast Ack/Nack Reporting", 3GPP TSG-GERAN Meeting WG2 #33bis, G2-070080, Mar. 26-30, 2007, XP008141559.

Panasonic, "Indication of combination between L1/L2 control signaling and uplink data", Mar. 2006, 3GPP TSG-RAN WG1 Meeting#44bis, R1-060793, Chapter 2.

NTT DoCoMo, Fujitsu, NEC, Sharp, Toshiba Corporation, "Single-Carrier Based Multiplexing of Uplink L1/L2 Control Channel", Jun. 2006, 3GPP TSG RAN WG1 LTE Ad Hoc, R1-061674, Chapter 3.

Panasonic, "CQI Feedback Control and Content in E-Utra", 3GPP TSG-RAN WG1 Meeting #49, May 7-11, 2007, p. 1-5, R1-072077.

"CQI handling during DRX", 3GPP RAN WG2 Meeting #58, R2-071901, May 2007.

Huawei, "Further considerations on multiplexing method of shared Control Channel in Uplink Single-Carrier FDMA", Internet Citation, Nov. 7-11, 2005, p. 1-6, XP002451165, R1-051430.

* cited by examiner

*FIG.10*

| UPLINK DATA | | RECEPTION QUALITY INFORMATION | |
|---|---|---|---|
| MODULATION SCHEME | CODING RATE | MODULATION SCHEME | CODING RATE |
| QPSK | 1/8 | QPSK,BPSK | 1/8,1/16 |
| QPSK | 1/4 | QPSK,BPSK | 1/4,1/8 |
| 16QAM | 1/4 | 16QAM,QPSK | 1/4,1/8 |
| 16QAM | 1/2 | 16QAM,QPSK | 1/2,1/4 |

*FIG.13*

| UPLINK DATA | | RECEPTION QUALITY INFORMATION | |
|---|---|---|---|
| MODULATION SCHEME | CODING RATE | MODULATION SCHEME | CODING RATE |
| QPSK | 1/8 | BPSK | 1/16 |
| QPSK | 1/4 | BPSK | 1/8 |
| 16QAM | 1/4 | QPSK | 1/4 |
| 16QAM | 1/2 | QPSK | 1/4 | ered to as "PUCCH"). And it is

MOBILE COMMUNICATION SYSTEM, BASE STATION APPARATUS, AND MOBILE STATION APPARATUS

This application is a Continuation of U.S. patent application Ser. No. 13/359,294, filed on Jan. 26, 2012, which is a Continuation of U.S. patent application Ser. No. 12/667,833, filed on Jan. 21, 2010, The U.S. patent application Ser. No. 12/667,833 is a National stage of International Application PCT/JP2008/062108 filed on Jul. 3, 2008, The International Application claims priority to Japanese Patent Application No. JP2007-240049 filed in Japan on Sep. 14, 2007 and JP2007-178728 filed in Japan on Jul. 6, 2007. The afore-mentioned patent applications are hereby incorporated by reference in their entireties.

TECHNICAL FIELD

The present invention relates to a mobile communication system in which a mobile station apparatus measures reception quality of signals received from a base station apparatus and transmits, to the base station apparatus, reception quality information while the base station apparatus allocates resources based on the reception quality information received from the mobile station apparatus, and relates to a base station apparatus and a mobile station apparatus which are applied to the mobile communication system.

BACKGROUND

Recently, the demand for data communication has been increasing in the field of mobile communication systems. As such, various techniques for higher utilization efficiency of frequency have been proposed for accommodating the increase in communication data caused by the data transmission demands. One of the techniques for improving the frequency utilization efficiency is the orthogonal frequency division multiple access (OFDMA). The OFDMA relates to a modulation method used for all cells within a communication area composed of cells to communicate with each other using the same frequency, and can realize faster data communication.

As for scheduling of transmission packets in an OFDMA system, a method is well-known in which mobile station apparatuses transmit, to a base station apparatus, channel quality indicator (CQI) which is information indicating reception quality of a downlink state for sub-carriers in wideband, while the base station apparatus performs packet scheduling based on the CQI of sub-carriers in wideband received from each mobile station apparatuses.

Additionally, a technique is also well-known in which for transmission packet scheduling in an orthogonal frequency division multiplexing (OFDM) system that utilizes a plurality of sub-carriers, mobile station apparatuses evaluate each channel states of a downlink (frequency characteristics, i.e., frequency-dependent characteristics of transmission losses) and transmit, to the base station apparatus, information obtained by quantizing each channel states, while the base station apparatus determines sub-carriers to be allocated for each mobile station apparatuses based on the transmitted information (Patent document 1).

FIG. 14 illustrates a communication method of the prior art between a base station apparatus and a mobile station apparatus. Having received downlink information of a downlink used for reception quality measurement from the base station apparatus, the mobile station apparatus measures reception quality of each channel based on the downlink information to create a channel profile of a propagation path.

The channel profile created by the mobile station apparatus is transmitted, from the mobile station apparatus to the base station apparatus, as reception quality information by using an uplink. Based on the reception quality information, the base station apparatus performs adaptive modulation and coding or frequency selective scheduling for signals to be transmitted from the base station apparatus to the mobile station apparatus.

As for transmission of the reception quality information to the base station apparatus by the mobile station apparatus, in Evolved Universal Terrestrial Radio Access studied under the third Generation Partnership Project (3GPP) which is international standardization project, it is studying that the reception quality information is transmitted by using a dedicated uplink control channel (Physical Uplink Control Channel, hereinafter referred to as "PUCCH"). And it is studying that an uplink data and the reception quality information are simultaneously transmitted by using an uplink data channel (Physical Uplink Shared Channel, hereinafter referred to as "PUSCH").

For example, in the Non-Patent document 1, there is proposed a method to transmit, in transmitting the reception quality information from the mobile station apparatus to the base station apparatus, the reception quality information by using the PUCCH or the PUSCH depending on a kind of services different in required the reception quality information.

[Patent document 1] JP-A-2005-130491

[Non-Patent document 1] "CQI handling during DRX", 3GPP, TSG RAN WG2 Meeting #58, R2-071901, May, 2007.

SUMMARY OF THE INVENTION

Disclosure of the Invention

Problems to be Solved by the Invention

However, in the prior arts, there are no specific descriptions about mapping of respective information in simultaneously transmitting the uplink data and the reception quality information from the mobile station apparatus to the base station apparatus.

As used herein, the phrase "mapping of respective information" refers to specific mapping of respective information (the uplink data and the reception quality information) as transmission data, that is, their specific mapping in a resource unit of the PUSCH (the minimum unit of a time-frequency block of the PUSCH) in simultaneously transmitting the uplink data and the reception quality information from the mobile station apparatus to a base station apparatus.

In case that the uplink data and the reception quality information are simultaneously transmitted from a mobile station apparatus to a base station apparatus, the base station apparatus can separate respective data by recognizing the mapping of the uplink data and the reception quality information. The base station apparatus can extract only the reception quality information from the simultaneously transmitted uplink data and reception quality information, and efficiently transmit a downlink data by performing adaptive modulation and coding and/or frequency selective scheduling based on the extracted information.

The information amount of control signals transmitted from the base station apparatus for specifying the mapping of the uplink data and the reception quality information simultaneously transmitted from the mobile station apparatus needs to be kept small. Downlink resources would be inefficiently utilized if the base station apparatus transmits the control signals for specifying the mapping of respective information every time in transmitting the reception quality information from the mobile station apparatus.

Additionally, there is another demand to reduce any delay in changing the mapping of the uplink data and the reception quality information simultaneously transmitted from the mobile station apparatus. If any significant delay occurs in changing the mapping of respective information in simultaneously transmitting the uplink data and the reception quality information from the mobile station apparatus, another significant delay would arise until the reception quality information arrives at the base station apparatus. The base station apparatus applies adaptive modulation and coding and/or frequency selective scheduling to the downlink data according to the reception quality information transmitted from the mobile station apparatus.

If any significant delay occurs in transmitting the reception quality information, the modulation and coding and the frequency band used for uplink data transmission most appropriate for the mobile station apparatus would change. Even if the base station apparatus performs adaptive modulation and coding and/or frequency selective scheduling based on the reception quality information with a significant delay, it would fail to control the mobile station apparatus in an appropriate manner for the mobile station apparatus at that time. This would result in inefficient use of the downlink resources.

Furthermore, modulation scheme and coding rate to be specified in transmitting the uplink data are specified by the base station apparatus estimating the environment of a propagation path based on the uplink data or a reference signal transmitted from the mobile station apparatus. Therefore, in case that the uplink data and the reception quality information are simultaneously transmitted, if modulation scheme and coding rate of the reception quality information cannot comply with those of the uplink data specified by the base station apparatus, the probability of successful transmission of the reception quality information would decrease.

The description above also applies to ACK/NACK of the Hybrid Automatic Repeat Request (HARQ) for the downlink data, which is also an uplink information like the reception quality information. That is, the information amount of control signals transmitted from the base station apparatus for specifying the mapping of the uplink data and the ACK/NACK simultaneously transmitted from the mobile station apparatus to the base station apparatus needs to be kept small. Also, the delay in changing the mapping must be small. Furthermore, modulation scheme and coding rate of the ACK/NACK simultaneously transmitted with the uplink data must comply with those of the uplink data specified by the base station apparatus. Any specific descriptions about those three conditions: the information amount of control information for specifying the mapping of respective information, the delay occurring in changing the mapping of respective information, and the compliance with modulation scheme and coding rate of the uplink data are not provided in the prior art.

In summary, what is important is how to specify the way of simultaneously transmitting the uplink data and the reception quality information as well as the uplink data and the ACK/NACK from the mobile station apparatus to the base station apparatus. In order to address the problem, the information amount of control signals for specifying the mapping of respective information from the base station apparatus, the delay occurring in changing the mapping of respective information, and the compliance with modulation scheme and coding rate of the uplink data specified by the base station apparatus, need to be taken into account.

The present invention has been made in view of such circumstances, and provides a mobile communication system, a base station apparatus and a mobile station apparatus that can reduce the amount of control information for specifying the transmission method for simultaneously transmitting the uplink data and the reception quality information as well as the uplink data and the ACK/NACK, reduce the delay occurring in changing the transmission method, and realize the mapping of the uplink data and the reception quality information and that of the uplink data and the ACK/NACK, in compliance with modulation scheme and coding rate of the uplink data specified by the base station apparatus.

Means for Solving the Problems

In order to achieve above objects, the invention provides the following means. Namely, a mobile communication system according to the present invention is directed to a mobile communication system where a mobile station apparatus transmits, to a base station apparatus, reception quality information indicating quality of signals received from the base station apparatus, wherein the base station apparatus transmits, to the mobile station apparatus, a signal for permitting data transmission in an uplink including resource allocation information for specifying time component or frequency component for an uplink data channel, and the mobile station apparatus calculates, from the resource allocation information, the number of symbols for reception quality information mapped together with uplink data onto the uplink data channel, and transmits, to the base station apparatus, reception quality information with the calculated number of symbols and the uplink data together by using the uplink data channel.

In addition, in the mobile communication system of the invention, the mobile station apparatus calculates the number of symbols for reception quality information so that the number does not exceed a predefined value.

In addition, in the mobile communication system of the invention, the mobile station apparatus calculates the number of symbols for reception quality information so that the number does not fall below a predefined value.

In addition, in the mobile communication system of the invention, the predefined value is set by a RRC signaling transmitted from the base station apparatus.

In addition, a mobile communication system according to the present invention is directed to a mobile communication system where a mobile station apparatus transmits, to a base station apparatus, ACK or NACK of the Hybrid Automatic Repeat Request (HARQ) for downlink data, wherein the base station apparatus transmits, to the mobile station apparatus, a signal for permitting data transmission in an uplink including resource allocation information for specifying time component or frequency component for an uplink data channel, and the mobile station apparatus calculates, from the resource allocation information, the number of symbols for ACK or NACK mapped together with uplink data onto the uplink data channel, and transmits, to the base station apparatus, ACK or NACK with the calculated number of symbols and the uplink data together by using the uplink data channel.

In addition, in the mobile communication system of the invention, the mobile station apparatus calculates the number of symbols for ACK or NACK so that the number does not exceed a predefined value.

In addition, in the mobile communication system of the invention, the mobile station apparatus calculates the number of symbols for ACK or NACK so that the number does not fall below a predefined value.

In addition, in the mobile communication system of the invention, the predefined value is set by a RRC signaling transmitted from the base station apparatus.

In addition, a mobile station apparatus according to the present invention is directed to a mobile station apparatus in a mobile communication system where the mobile station apparatus transmits, to a base station apparatus, reception quality information indicating quality of signals received from the base station apparatus, and comprising: an unit for receiving, from the base station apparatus, resource allocation information for specifying time component or frequency component for an uplink data channel included in a signal for permitting data transmission in an uplink; an unit for calculating, from the resource allocation information, the number of symbols for reception quality information mapped together with uplink data onto the uplink data channel; and an unit for transmitting, to the base station apparatus, reception quality information with the calculated number of symbols and the uplink data together by using the uplink data channel.

In addition, in the mobile station apparatus of the invention, the mobile station apparatus calculates the number of symbols for reception quality information so that the number does not exceed a predefined value.

In addition, in the mobile station apparatus of the invention, the mobile station apparatus calculates the number of symbols for the reception quality information so that the number does not fall below a predefined value.

In addition, in the mobile station apparatus of the invention, wherein the predefined value is set by a RRC signaling transmitted from the base station apparatus.

In addition, a mobile station apparatus according to the present invention is directed to a mobile station apparatus in a mobile communication system where the mobile station apparatus transmits, to a base station apparatus, ACK or NACK of the Hybrid Automatic Repeat Request (HARQ) for downlink data, and comprising: an unit for receiving, from the base station apparatus, resource allocation information for specifying time component or frequency component for an uplink data channel included in a signal for permitting data transmission in an uplink; an unit for calculating, from the resource allocation information, the number of symbols for ACK or NACK mapped together with uplink data onto the uplink data channel; and an unit for transmitting, to the base station apparatus, ACK or NACK with the calculated number of symbols and the uplink data together by using the uplink data channel.

In addition, in the mobile station apparatus of the invention, the mobile station apparatus calculates the number of symbols for ACK or NACK so that the number does not exceed a predefined value.

In addition, in the mobile station apparatus of the invention, the mobile station apparatus calculates the number of symbols for ACK or NACK so that the number does not fall below a predefined value.

In addition, in the mobile station apparatus of the invention, wherein the predefined value is set by a RRC signaling transmitted from the base station apparatus.

In addition, a base station apparatus according to the present invention is directed to a base station apparatus in a mobile communication system where a mobile station apparatus transmits, to the base station apparatus, reception quality information indicating quality of signals received from the base station apparatus, and comprising: an unit for transmitting, to the mobile station apparatus, resource allocation information for specifying time component or frequency component for an uplink data channel included in a signal for permitting data transmission in an uplink; an unit for calculating, from the resource allocation information, the number of symbols for reception quality information mapped together with uplink data onto the uplink data channel, and for receiving, from the mobile station apparatus, reception quality information transmitted with the calculated number of symbols from the resource allocation information and the uplink data together by using the uplink data channel.

In addition, a base station apparatus according to the present invention is directed to a base station apparatus in a mobile communication system where a mobile station apparatus transmits, to the base station apparatus, ACK or NACK of the Hybrid Automatic Repeat Request (HARQ) for downlink data, comprising: an unit for transmitting, to the mobile station apparatus, resource allocation information for specifying time component or frequency component for an uplink data channel included in a signal for permitting data transmission in an uplink; an unit for calculating, from the resource allocation information, the number of symbols for ACK or NACK mapped together with uplink data onto the uplink data channel, and for receiving, from the mobile station apparatus, ACK or NACK transmitted with the calculated number of symbols from the resource allocation information and the uplink data together by using the uplink data channel.

In addition to, in the base station apparatus of the present invention, the scheduler unit performs scheduling of includes, as the control information, information for specifying modulation scheme and coding rate of uplink data in the transmission signal.

In addition to, a mobile station apparatus according to the present invention is directed to a mobile station apparatus is allocated resources by a base station apparatus, and comprising: a receiving unit for receiving, from the base station apparatus, control information for specifying a transmission format of information to be transmitted using an uplink, and a transmitting unit for transmitting, to the base station apparatus, uplink data and reception quality information together based on the specified transmission format in case that the receiving unit has received the control information from the base station apparatus.

In addition to, in the mobile station apparatus of the present invention, the transmission format of information to be transmitted using the uplink is that of uplink data, and the receiving unit automatically recognizes a transmission format of reception quality information from that of uplink data.

In addition to, in the mobile station apparatus of the present invention, in case that the receiving unit has received, from the base station apparatus, resource information specified by frequency component and time component as the control information, the transmitting unit transmits, to the base station apparatus, uplink data and reception quality information together in the transmission format based on mapping of uplink data and reception quality information, which is associated with the resource information.

In addition to, in the mobile station apparatus of the present invention, in case that the receiving unit has received, from the base station apparatus, information for specifying modulation scheme and coding rate of uplink data as the control information, the transmitting unit identifies modulation scheme and coding rate of reception quality information, which are associated with the information for specifying modulation scheme and coding rate of uplink data received from the base station apparatus, and transmits, to the base station apparatus, uplink data to which the modulation scheme and coding rate of the information for specifying modulation scheme and coding rate received from the base station apparatus are applied, together with reception quality information to which the identified modulation scheme and coding rate are applied.

In addition to, a mobile station apparatus according to the present invention is directed to a mobile station apparatus is allocated resources by the base station apparatus, and comprising: a receiving unit for receiving, from the base station apparatus, control information for specifying a transmission format of information to be transmitted using an uplink, and a transmitting unit for transmitting, to the base station apparatus, uplink data and ACK/NACK together based on the specified transmission format in case that the receiving unit has received the control information from the base station apparatus.

In addition to, in the mobile station apparatus of the present invention, the transmission format of information to be transmitted using the uplink is that of uplink data and that of ACK/NACK.

In addition to, in the mobile station apparatus of the present invention, the transmission format of information to be transmitted using the uplink is that of uplink data, and the receiving unit automatically recognizes a transmission format of ACK/NACK from that of the uplink data.

In addition to, in the mobile station apparatus of the present invention, in case that the receiving unit has received, from the base station apparatus, resource information specified by frequency component and time component as the control information, the transmitting unit transmits, to the base station apparatus, uplink data and ACK/NACK together in the transmission format based on mapping of uplink data and ACK/NACK, which is associated with the resource information.

In addition to, in the mobile station apparatus of the present invention, in case that the receiving unit has received, from the base station apparatus, information for specifying modulation scheme and coding rate of uplink data as the control information, the transmitting unit identifies modulation scheme and coding rate of ACK/NACK, which are associated with the information for specifying modulation scheme and coding rate of uplink data received from the base station apparatus, and transmits, to the base station apparatus, uplink data to which the modulation scheme and coding rate of the information for specifying modulation scheme and coding rate received from the base station apparatus are applied, together with ACK/NACK to which the identified modulation scheme and coding rate are applied.

According to the present invention, as the base station apparatus transmits, to the mobile station apparatus, control information for specifying a transmission format for the mobile station apparatus to simultaneously transmit the uplink data and the reception quality information, and the mobile station apparatus simultaneously transmits, to the base station apparatus, the uplink data and the reception quality information based on the specified transmission format in case of having received the control information from the base station apparatus, transmission of control signals for specifying the mapping of respective information can be omitted, and the downlink resources can be effectively utilized. Additionally, as the transmission format is specified based on the way of allocating uplink resources, the mapping of the uplink data and the reception quality information can be changed, and the transmission of control signals for changing the mapping of respective information can be omitted. As a result, the delay occurring in changing the mapping of respective information can be reduced.

BRIEF DESCRIPTION OF THE DRAWINGS

FIG. 10 illustrates the content of a predefined table used for a mobile communication system according to a second embodiment of the invention.

FIG. 13 illustrates the content of a predefined table according to the third embodiment of the invention.

DESCRIPTION OF THE REFERENCE NUMERALS

Figure 1:
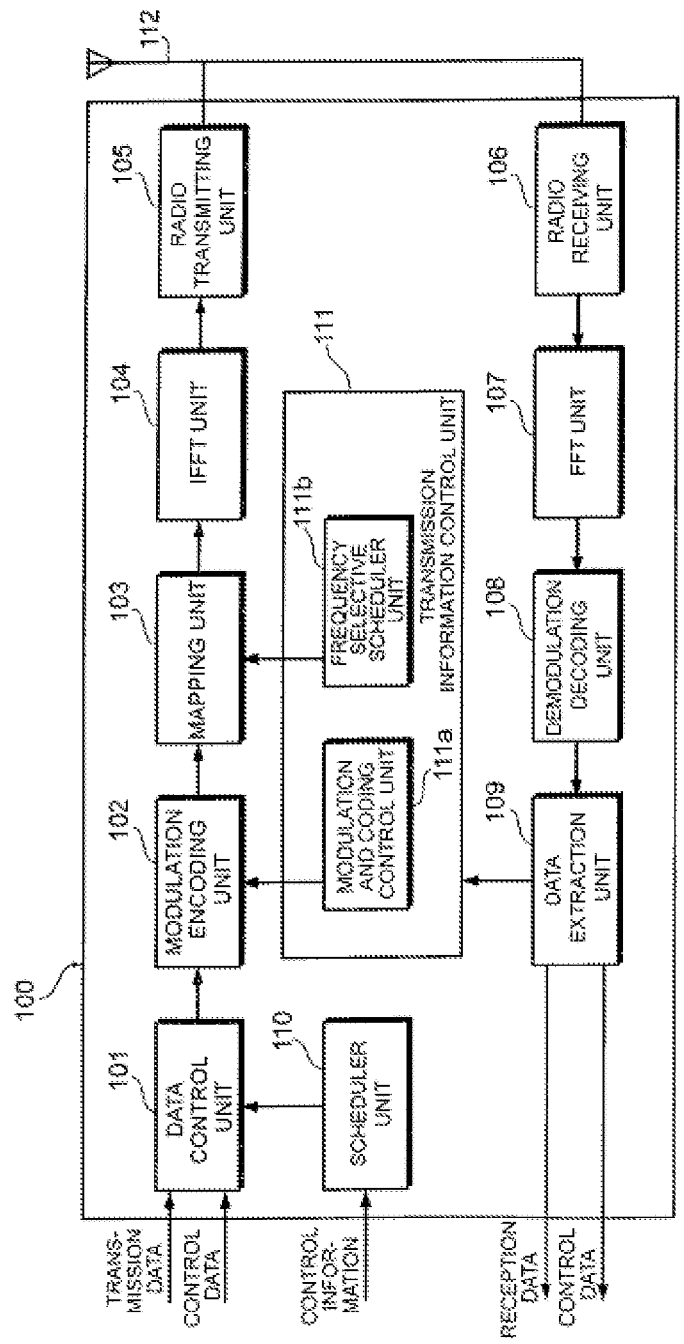
FIG. 1 illustrates a block diagram showing a schematic configuration of a base station apparatus according to a first embodiment of the invention.

100: base station apparatus
101: data control unit
102: modulation encoding unit
103: mapping unit
104: IFFT unit
105: radio transmitting unit
106: radio receiving unit
107: FFT unit
108: demodulation decoding unit
109: data extraction unit
110: scheduler unit
111: transmission information control unit
111a: modulation and coding control unit
111b: frequency selective scheduler unit
112: antenna 200: mobile station apparatus
201: data control unit
202: modulation encoding unit
203: mapping unit
204: IFFT unit
205: radio transmitting unit
206: radio receiving unit
207: FFT unit
208: demodulation decoding unit
209: data extraction unit
210: reception quality information control unit
210a: reception quality information generating unit
210b: reception quality measuring unit
211: antenna

BEST MODES FOR CARRYING OUT THE INVENTION

Now, various embodiments of the invention will be described with reference to the diagrams.

DETAILED DESCRIPTION OF ILLUSTRATIVE EMBODIMENTS

First Embodiment

First, a mobile communication system according to a first embodiment of the invention will be described. The mobile communication system comprises a base station apparatus and a mobile station apparatus. FIG. 1 illustrates a block diagram showing a schematic configuration of the base station apparatus according to the first embodiment of the invention. The base station apparatus 100 includes a data control unit 101, a modulation encoding unit 102, a mapping unit 103, an inverse fast Fourier transformation (IFFT) unit 104, a radio transmitting unit 105, a radio receiving unit 106, a fast Fourier transformation (FFT) unit 107, a demodulation decoding unit 108, a data extraction unit 109, a scheduler unit 110, a transmission information control unit 111, and an antenna 112. The transmission information control unit 111 includes a modulation encoding control unit 111a and a frequency selective scheduler unit 111b.

Transmission data to be transmitted to each mobile station apparatuses and control data are input to data control unit 101 in the base station apparatus 100, and each data is transmitted sequentially to the mobile station apparatuses following instructions of the scheduler unit 110. The modulation encoding unit 102 applies modulation and error-correcting coding to signals input from the data control unit 101 based on modulation scheme and coding rate determined by the modulation encoding control unit 111a, and outputs each data to the mapping unit 103. The mapping unit 103 maps data input from the modulation encoding unit 102 onto each sub-carrier based on frequency selective scheduling information provided by the frequency selective scheduler unit 111b, and outputs each of the data to the IFFT unit 104.

The IFFT unit 104 applies inverse fast Fourier transformation to data input from the mapping unit 103, then converts the input data into temporal baseband digital signals, and finally outputs the signals into the radio transmitting unit 105. In the radio transmitting unit 105, digital/analog conversion is applied to the output signals from the IFFT unit 104, and the resultant signals are then up-converted to a frequency appropriate for transmission and transmitted to each mobile station apparatuses via the antenna 112.

The scheduler unit 110 performs scheduling for both the downlink and the uplink based on control information, such as resource regions available to each mobile station apparatuses, intermittent transmitting/receiving cycles, a format of a transmission data channel and buffer status. The modulation encoding control unit 111a determines modulation scheme and coding rate to be applied to each data based on the reception quality information transmitted from the mobile station apparatus and outputs them to the modulation encoding unit 102. The frequency selective scheduler unit 111b applies frequency selective scheduling to each data based on the reception quality information transmitted from the mobile station apparatus and outputs the result to the mapping unit 103.

Figure 2:
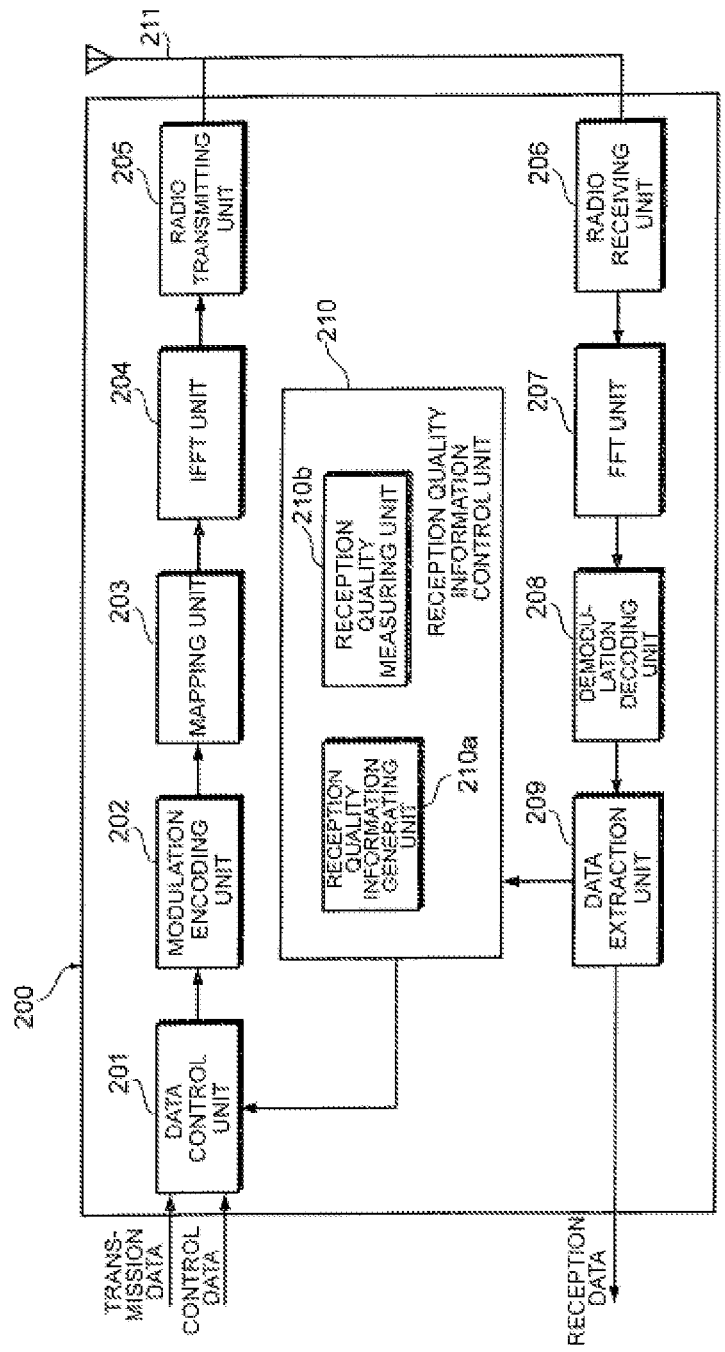
FIG. 2 illustrates a block diagram showing a schematic configuration of a mobile station apparatus according to the first embodiment of the invention.

FIG. 2 illustrates a block diagram showing a schematic configuration of the mobile station apparatus according to the first embodiment of the invention. A mobile station apparatus 200 includes a data control unit 201, a modulation encoding unit 202, a mapping unit 203, an inverse fast Fourier transformation (IFFT) unit 204, a radio transmitting unit 205, a radio receiving unit 206, a fast Fourier transformation (FFT) unit 207, a demodulation decoding unit 208, a data extraction unit 209, a reception quality information control unit 210, and an antenna 211. The reception quality information control unit 210 includes a reception quality information generating unit 210a and a reception quality measuring unit 210b. Note here that a receiving unit is composed of the radio receiving unit 206, the FFT unit 207, the demodulation decoding unit 208, the data extraction unit 209, and the reception quality information control unit 210, while a transmitting unit is composed of the data control unit 201, the modulation encoding unit 202, the mapping unit 203, the inverse fast Fourier transformation (IFFT) unit 204, and the radio transmitting unit 205.

Transmission data to be transmitted to the base station apparatus and control data are input to the data control unit 201 in the mobile station apparatus 200, and those data are transmitted sequentially to the base station apparatus. The modulation encoding unit 202 applies modulation and error-correcting coding to signals input from the data control unit 201, and outputs each data to the mapping unit 203. The mapping unit 203 maps data input from the modulation encoding unit 202 onto each sub-carrier, and outputs each of the data to the IFFT unit 204.

The IFFT unit 204 applies inverse fast Fourier transformation to a sequence of symbols input from the mapping unit 203, converts them into temporal baseband digital signals, and outputs them to the radio transmitting unit 205. In the radio transmitting unit 205, digital/analog conversion is applied to the output signals from the IFFT unit 124, and the resultant signals are up-converted to a frequency appropriate for transmission and then transmitted to the base station apparatus via the antenna 211.

The reception quality measuring unit 210b of the reception quality information control unit 210 measures reception quality of signals received from the base station apparatus. The reception quality information generating unit 210a generates reception quality information to be transmitted to the base station apparatus based on the information measured by the reception quality measuring unit 210b.

The receiving unit composed of the radio receiving unit 206, the FFT unit 207, the demodulation decoding unit 208, the data extraction unit 209, and the reception quality information control unit 210, receives control information for specifying a transmission format of information to be transmitted using the uplink from the base station apparatus, and based on the specified format, recognizes a transmission format for transmitting the uplink data and the reception quality information, as well as the uplink data and the ACK/NACK.

The transmitting unit composed of the data control unit 201, the modulation encoding unit 202, the mapping unit 203, the IFFT unit 204, and the radio transmitting unit 205, simultaneously transmits, to the base station apparatus, the uplink data and the reception quality information, as well as the uplink data and the ACK/NACK in the transmission format recognized by the receiving unit.

Figure 3:
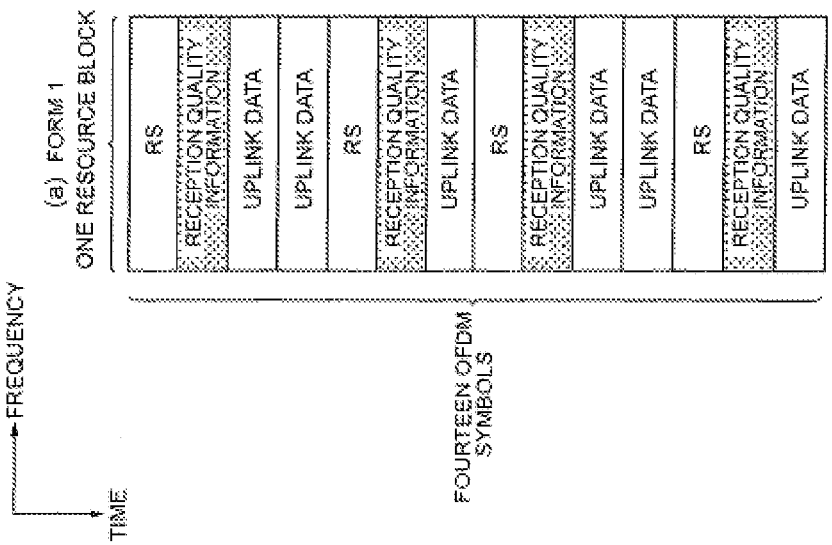
FIG. 3 illustrates an exemplary mapping of information according to the first embodiment of the invention.

FIG. 3 illustrates an exemplary mapping of uplink data and reception quality information transmitted from the mobile station apparatus to the base station apparatus according to the first embodiment of the invention. FIG. 3 illustrates form 1 and form 2. For each form, the vertical direction represents a time axis, and here includes fourteen OFDM symbols as an example of resources allocated by the base station apparatus. A plurality of known reference symbols (pilot signals, hereinafter referred to as "RS") used for propagation path estimation to demodulate data, different number of the reception quality information and the uplink data between the form 1 and the form 2 are mapped onto these fourteen OFDM symbols.

On the other hand, the horizontal direction represents a frequency axis. Assuming a resource unit of the PUSCH (the minimum unit of a time-frequency block of the PUSCH) as one resource block, the base station apparatus allocates resources of one resource block in the form 1 and that of two resource blocks in the form 2, in the frequency axis direction.

The mobile station apparatus transmits data by using the PUSCH according to resource allocation specified by a downlink control channel (Physical Downlink Control Channel, which will be referred to as "PDCCH" hereinafter) from the base station apparatus. In other words, this downlink control channel (PDCCH) is a signal for permitting data transmission in the uplink (i.e., L1/L2 grant).

In the embodiment, the mobile station apparatus performs the mapping of information in simultaneously transmitting the uplink data and the reception quality information according to resources allocated by the base station apparatus using the L1/L2 grant.

More particularly, the form 1 of FIG. 3 illustrates that the mobile station apparatus is allocated, by using the L1/L2 grant from the base station apparatus, resources having the amount of fourteen OFDM symbols in the time axis direction and one resource block in the frequency axis direction, and performs the mapping of the uplink data and the reception quality information associated with the allocated resources. Here, an element composed of one OFDM symbol and one sub-carrier is referred to as "resource element". In this example, if one resource block composed of twelve sub-carriers, the number of resource element for one OFDM symbol and one resource block is twelve, and the number of resource element in one resource block is 168.

Similarly, the form 2 of FIG. 3 illustrates that the mobile station apparatus is allocated, by using the L1/L2 grant from the base station apparatus, resources having the amount of fourteen OFDM symbols in the time axis direction and two resource blocks in the frequency axis direction, and performs the mapping of the uplink data and the reception quality information associated with the allocated resources.

Here, it can be predetermined what type of resources the base station apparatus allocates by using the L1/L2 grant and accordingly how the mobile station apparatus maps the uplink data and the reception quality information. That is, according to the embodiment, it is predetermined in case that the base station apparatus allocates resources having the amount of fourteen OFDM symbols in the time axis direction and one resource block in the frequency axis direction, the mobile station apparatus performs the mapping of the uplink data and the reception quality information represented by the form 1. Similarly, it is also predetermined that in case that the base station apparatus allocates resources having the amount of fourteen OFDM symbols in the time axis direction and two resource blocks in the frequency axis direction, the mobile station apparatus performs the mapping of the uplink data and the reception quality information represented by the form 2.

Because, when allocating resources to the mobile station apparatus by using the L1/L2 grant, the base station apparatus knows in advance what kind of mapping (e.g., form 1 or form 2) of the uplink data and the reception quality information transmitted simultaneously, the base station apparatus can separate the uplink data and the reception quality information. Then, the base station apparatus can apply adaptive modulation and coding and/or frequency selective scheduling to the downlink data based on the extracted reception quality information.

Next, the form 1 and the form 2 illustrated above as an example of mapping of the uplink data and the reception quality information simultaneously transmitted from the mobile station apparatus to the base station apparatus will be described in more detail. The form 1 has more reception quality information in the time axis direction (including fourteen OFDM symbols herein). In this form, the reception quality information transmitted from the mobile station apparatus to the base station apparatus is mapped so as to be more tolerant against the temporal variation in a propagation path. On the other hand, the form 2 has more reception quality information in the frequency axis direction. In this form, the reception quality information transmitted from the mobile station apparatus to the base station apparatus is mapped so as to be more tolerant against the frequency variation in the propagation path.

Figure 4:
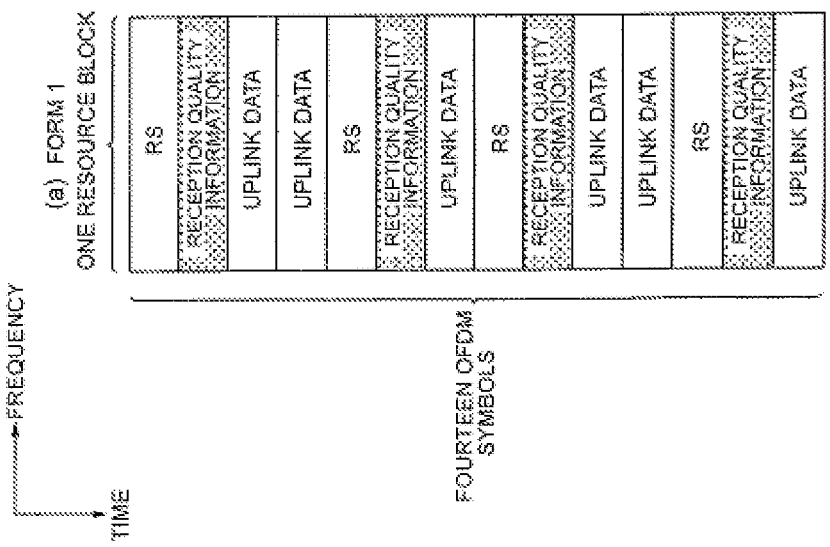
FIG. 4 illustrates an exemplary mapping of information according to the first embodiment of the invention.

Similarly, FIG. 4 illustrates another exemplary mapping of the uplink data and the reception quality information transmitted from a mobile station apparatus according to the first embodiment of the invention. On the left side of the figure is shown a form similar to the form 1 in FIG. 3. The form 3 of FIG. 4 illustrates that the reception quality information can be simply mapped in the lower (or higher) frequency for the resources allocated by the base station apparatus. With this simple mapping, the base station apparatus can separate the uplink data and the reception quality information without any complicated processes.

Figure 5:
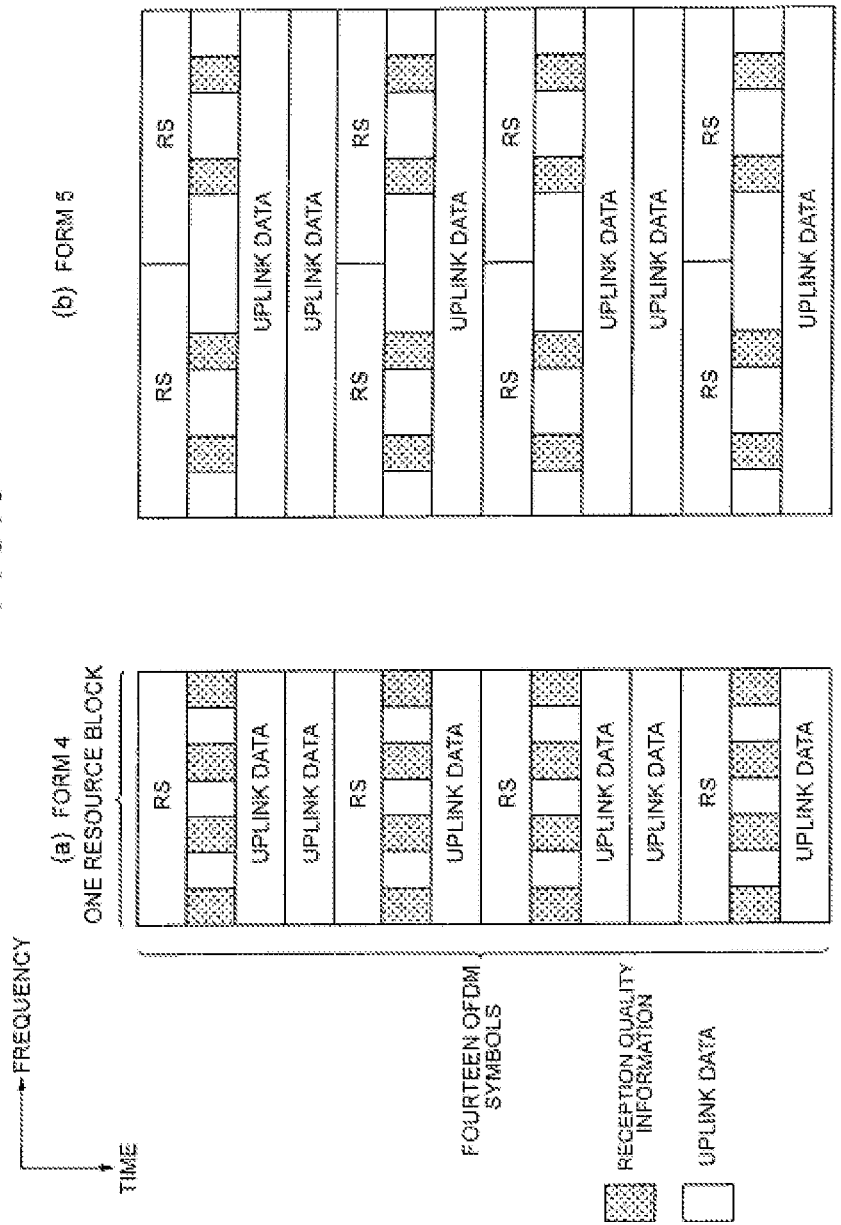
FIG. 5 illustrates an exemplary mapping of information according to the first embodiment of the invention.

Similarly, FIG. 5 illustrates another exemplary mapping of the uplink data and the reception quality information transmitted from a mobile station apparatus according to the first embodiment of the invention. On the left side of the figure is shown form 4 similar to the form 1 of FIG. 3. The form 4 is significantly different from the form 1 in that the reception quality information is mapped in the frequency axis direction in a distributed manner and that the uplink data is inserted into the place where the reception quality information was. Each region for the reception quality information is composed of one or more resource element groups. Also, as shown in the form 5 in FIG. 5, by mapping the reception quality information in the frequency axis direction in a distributed manner, the mapping more tolerant against the frequency variation in a propagation path can be achieved, while a resource of the same size as the form 4 still being used for transmitting the reception quality information (although four resource element groups in the form 4 and two resource element groups in the form 5 are used for one OFDM symbol, the size of the forms is the same because the latter form uses two resource blocks in the frequency axis direction).

Figure 6:
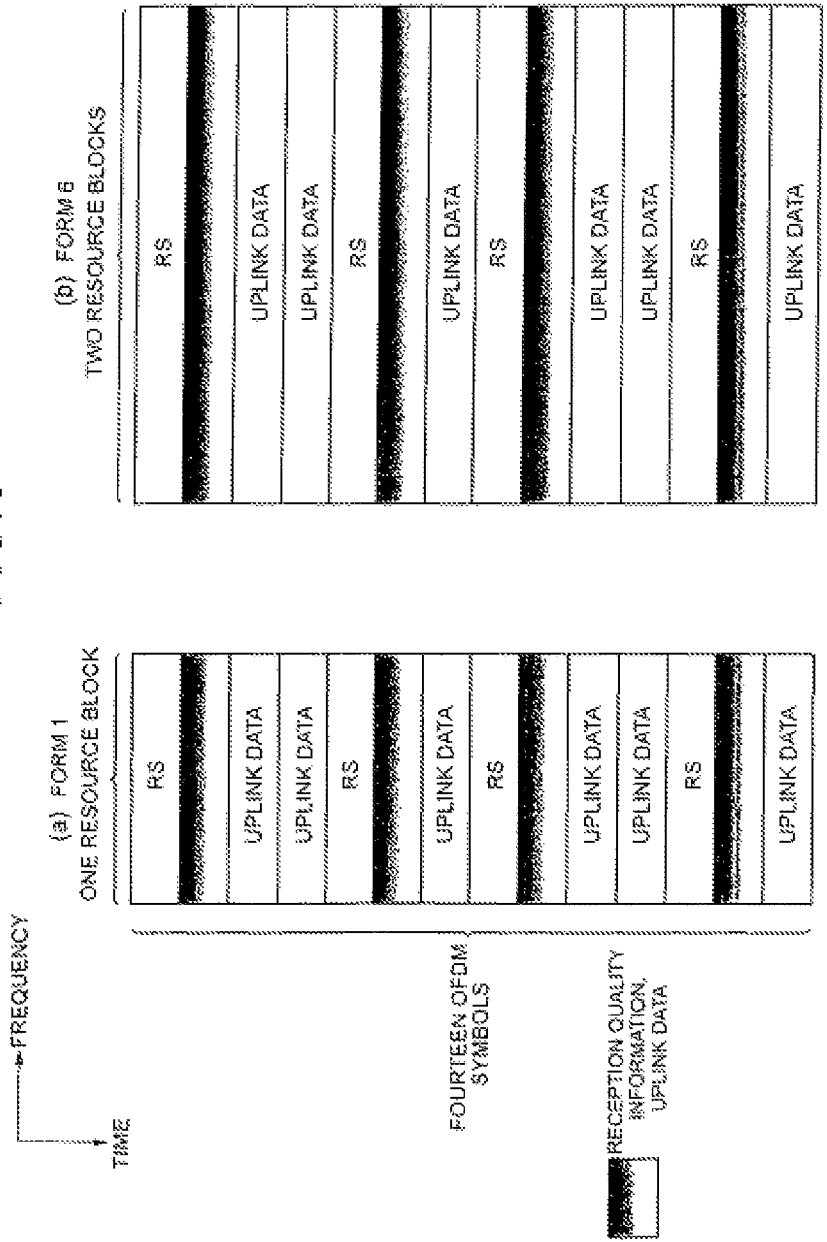
FIG. 6 illustrates an exemplary mapping of information according to the first embodiment of the invention.
Figure 7:
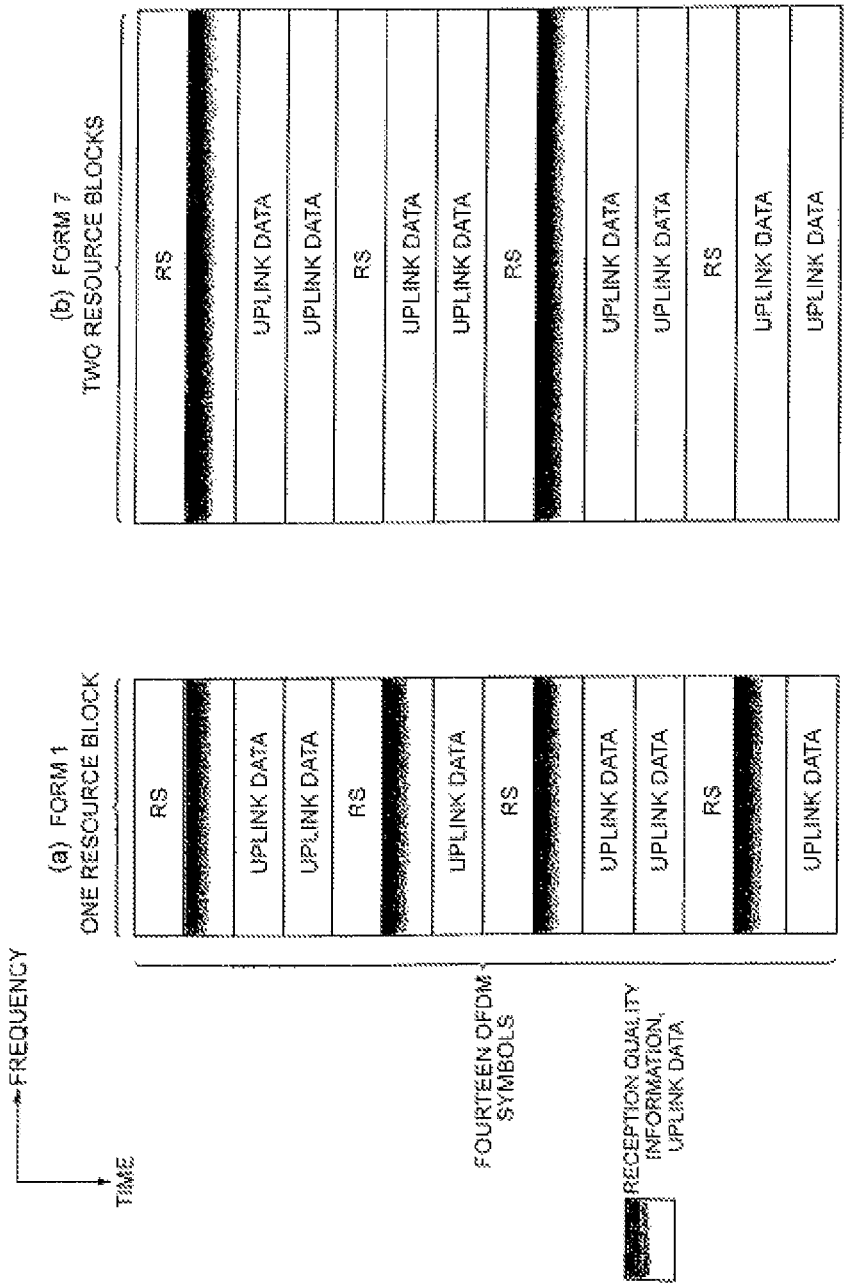
FIG. 7 illustrates an exemplary mapping of information according to the first embodiment of the invention.
Figure 8:
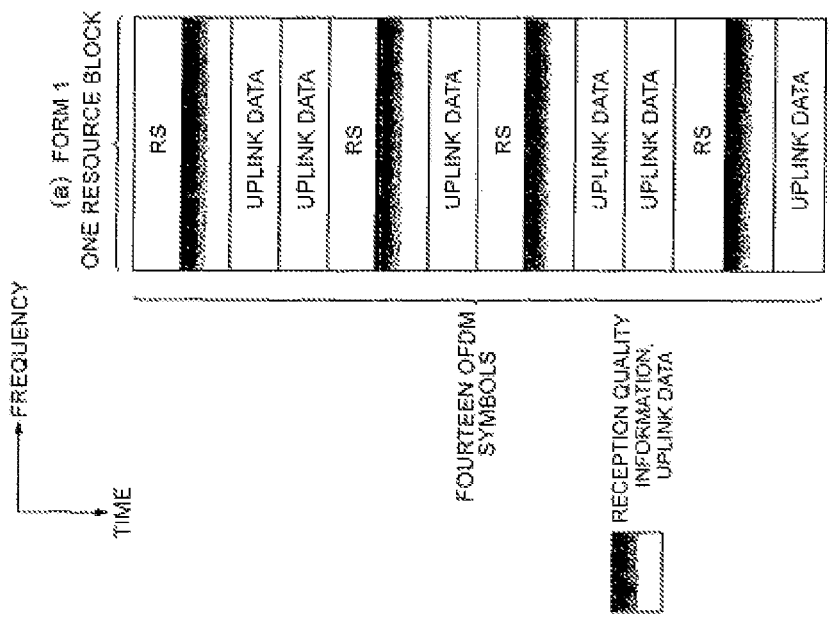
FIG. 8 illustrates an exemplary mapping of information according to the first embodiment of the invention.

Furthermore, FIGS. 6 to 8 illustrate exemplary mappings of the uplink data and the reception quality information transmitted from the mobile station apparatus according to the first embodiment of the invention. Those figures are significantly different from FIGS. 3 to 5 in that in each form, the mapping of the uplink data and the reception quality information is illustrated with gradation pattern. Forms depicted on the left side of FIGS. 6 to 8 are shown as form 1' associated with the form 1 illustrated in FIG. 3.

In FIGS. 6 to 8, conceptually, the gradation patterns show that the uplink data and the reception quality information are mixedly mapped also in one resource element. More particularly, they are mixed prior to their mapping onto the resource element. In those figures, the black part and the white part of the gradation pattern indicate the reception quality information and the uplink data, respectively. The uplink data and the reception quality information are mixed before being mapped onto the resource element, and then mapped onto twelve resource elements, for example. That is, conceptually, one resource element contains a part of the reception quality information and a part of the uplink data.

The form 1' in FIG. 6 illustrates the mapping of the uplink data and the reception quality information in case that one resource block is specified by the L1/L2 grant. In the form 1', the uplink data and the receipt quality information are mixedly mapped in four OFDM symbols of the fourteen OFDM symbols. On the other hand, the form 6 in FIG. 6 illustrates the mapping of the uplink data and the reception quality information in case that two resource blocks are specified by the L1/L2 grant. In this form 6, in four OFDM symbols of the fourteen OFDM symbols, the uplink data and the reception quality information are mapped as mixedly transmitted resources, and are further mapped using two resource blocks in the frequency direction. The form 6 in FIG. 6 is the form that was mapped so that the information amount of the reception quality information can increase as the number of allocated resource blocks increases. Also, for the form 1' and the form 6, the black part showing the reception quality information with gradation is depicted with the same density. This indicates that ratios of the uplink data and the reception quality information mixed in the form 1' and the form 6 are same.

The form 1' in FIG. 7 is similar to the form 1' illustrated in FIG. 6. Also, the form 7 illustrates, similar to the form 6 in FIG. 6, the mapping of the uplink data and the reception quality information in case that two resource blocks are specified by the L1/L2 grant. In this form 7, in two OFDM symbols of the fourteen OFDM symbols, the uplink data and the reception quality information are mixedly mapped as transmitted resources, and further are mapped using two resource blocks in the frequency direction. Therefore, the form 7 is the form that was mapped so that the information amount of the reception quality information can not increase as the number of allocated resource blocks increases. Also, for the form 1' and the form 7, the black part showing the reception quality information with gradation is depicted with the same density, indicates that the ratios of the uplink data and the reception quality information mixed are same.

The form 1' illustrated in FIG. 8 is similar to the form 1' illustrated in FIG. 6. The form 1' and form 8 are significantly different in that each of the black part in the gradation pattern indicating the reception quality information is depicted with different density. For example, the black part of the form 8 has lighter density. This implies that the ratios of the uplink data and the reception quality information mixed in the form 1' and the form 8 are different, and implies that the ratios of the uplink data and the reception quality information mixed before being mapped onto the resource element. In FIG. 8, it is shown the information amount of the overall reception quality information to be transmitted in the form 1' and the form 8 is same.

Now, details will be described with reference to a more specific example. For the form 1' of FIG. 8, assuming that the reception quality information with the amount of "4" and the uplink data with the amount of "6" are mixed in resource having one symbol and one resource block, then for the form 8, the reception quality information with the amount of "2" and the uplink data with the amount of "8" would be mixed in such resource. That is, the amount of the reception quality information included in resource of one symbol and one resource block becomes smaller. However, compared to the form 1', the form 8 has the double number of resource blocks in which the uplink data and the reception quality information are mixed for transmission. That is, the reception quality information transmitted in whole form 1' and that in whole form 7 have the same amount of information amount.

If the uplink data and the resource quality information such as illustrated in FIGS. 6 to 8 are mixed before being mapped onto the resource element, and the base station apparatus receives information mapped in a distributed manner onto multiple resource elements, then the base station apparatus can be composed to be able to extract received information as one integrated information (the reception quality information, the uplink data) after receiving all of the distributed resource elements.

As described above, with the mapping conceptually illustrated in FIGS. 6 to 8 in which the uplink data and the reception quality information are mixed before being mapped onto the resource element, the mobile station apparatus needs not determine where the resource element including the uplink data or the reception quality information should be mapped, and can efficiently perform tasks needed on mapping information onto the resource element. Such mixing of the uplink data and the reception quality information can be done by, for example, inserting the reception quality information per modulation symbol into the place where the uplink data was, and by applying, for example, discrete Fourier conversion to the information.

A mobile station apparatus can perform the mapping of the uplink data and the reception quality information as shown in FIGS. 3 to 8 depending on resources allocated by the L1/L2 grant from the base station apparatus. To describe FIGS. 6 to 8 in further detail, the mobile station apparatus can change the ratio of the uplink data and the reception quality information to be mixed, depending on resources allocated by the L1/L2 grant from the base station apparatus. In short, with reference to FIG. 8, the mobile station apparatus can change the density of the black part indicating the reception quality information depending on resources allocated by the L1/L2 grant from the base station apparatus. Note here that the mapping of information described above is exemplary only, and for example, the mappings shown in FIGS. 3 to 8 can be combined, and any mapping of the uplink data and the reception quality information to be simultaneously transmitted from the mobile station apparatus can be possible.

The way of mapping the reception quality information on the resource element groups described above can be roughly divided into two parts. The one is for increasing the resource amount of the reception quality information in proportion to that of resources allocated for the uplink data. For example, as in the forms 1, 1' and 6, in case that four resource element groups are mapped in one resource block as the reception quality information, if two resource blocks are allocated the reception quality information is transmitted in eight resource element groups. The other is for changing the mapping so that the resource amount (the number of resource elements) of the reception quality information can be always constant, depending on resource allocation for the uplink data. An example of this mapping is any of the mappings of form 2, 3, 5, 7 or 8. In this embodiment, modulation scheme and coding rate applied to the reception quality information are set to be constant.

Now, the former and latter mapping methods described above are defined as "information-increasing type" and "information-keeping type", respectively. It will also be described how to control each type of mapping method. First, a control method for the information-increasing type of mapping method in the base station apparatus will be described. When performing the information-increasing type of mapping, the base station apparatus can transmit, to a mobile station apparatus, a RRC signaling including information indicating the minimum amount and/or the maximum amount of resources in which the reception quality information can be mapped.

Note here that, for example, the minimum amount of resources, in which the reception quality information can be mapped, can be set as the resource amount of the reception quality information (e.g., the number of modulation symbols, the number of resource elements, the information amount, etc.) that can be mapped in one resource block. That is, it is the maximum resource amount of the reception quality information that can be mapped in one resource block. Meanwhile, the maximum amount of resources, in which the reception quality information can be mapped, can be set as the maximum resource amount of the reception quality information (e.g., the number of modulation symbols, the number of resource elements, the information amount, etc.) that can be mapped in resource blocks allocated by the base station apparatus.

A mobile station apparatus continues to perform the mapping of the uplink data and the reception quality information with the information-increasing type (see the forms 1, 1' and 6) based on the number of resource blocks and/or the transport block size allocated by the L1/L2 grant before reaching the minimum amount of resources, in which the reception quality information can be mapped (the maximum amount of the reception quality information to be mapped in one resource block), set by the RRC signaling from the base station apparatus.

Additionally, in case that the resources calculated based on the L1/L2 grant in mapping the reception quality information exceed the maximum amount of resources, in which the reception quality information can be mapped, set by the RRC signaling from the base station apparatus, the mobile station apparatus maps the uplink data and the reception quality information, and so that the resource amount does not exceed the maximum amount of resources set by the base station apparatus, by decreasing the resource amount in the time direction for mapping the reception quality information as shown in the form 7, or by decreasing the reduction rate of the uplink data to decrease the ratio of resource amount for mapping the reception quality information as shown in the form 8.

Furthermore, in case that the resources calculated based on the L1/L2 grant in mapping the reception quality information fall below the minimum amount of resources, in which the reception quality information can be mapped, set by the RRC signaling from the base station apparatus, the mobile station apparatus maps the uplink data and the reception quality information, and so that the resource amount does not fall below the minimum amount set by the base station apparatus, by increasing the resource amount in the time direction for mapping the reception quality information as shown in the form 7, or by increasing the reduction rate of the uplink data to increase the ratio of resource amount for mapping the reception quality information as shown in the form 8.

In this way, the base station apparatus transmits the RRC signaling including information indicating the minimum amount and/or the maximum amount of resources in which the reception quality information can be mapped. Having received the signal, the mobile station apparatus changes the mapping of the uplink data and the reception quality information, and transmits them simultaneously. Hereby, even when the resources for transmitting the reception quality information calculated based on the L1/L2 grant is larger (i.e., when the uplink data having larger information amount is transmitted), the transmission of the reception quality information with a certain amount or more (i.e., the reception quality information having too large information amount) by the mobile station apparatus can be avoided, and significant increase of overhead of the uplink caused by the transmission of the reception quality information can be avoided. Also, even when the resources for transmitting the reception quality information calculated based on the L1/L2 grant is smaller (i.e., when the uplink data having smaller information amount is transmitted), the mobile station apparatus can transmit the reception quality information with a certain amount or more (the reception quality information set by the minimum amount), and the quality of the reception quality information can be maintained above a certain level. Moreover, by setting the minimum amount that can be calculated based on the L1/L2 grant as the minimum amount, the transmission of the reception quality information that falls below the minimum amount by the mobile station apparatus can be avoided. Here, by defining an equation for the resources for transmitting the reception quality information not to exceed the maximum amount and not to fall below the minimum amount, each of which can be calculated based on the L1/L2 grant, the maximum amount or the minimum amount need not to be set by using the RRC signaling.

Subsequently, a control method for the information-keeping type of mapping method in a base station apparatus will be described. When the mobile station apparatus performs the information-keeping type of mapping, the base station apparatus can transmit, to the mobile station apparatus, the RRC signaling including information indicating a certain amount (keeping value, hereinafter) of resources in which the reception quality information can be mapped. Note here that the keeping amount of resources, in which the reception quality information can be mapped, can be defined as a certain resource amount (e.g., the number of modulation symbols, the number of resource elements, the information amount, etc.) of the reception quality information that can be mapped in resource blocks allocated by the base station. If the RRC signaling from the base station apparatus sets the keeping value to a size of "10", the mobile station apparatus maps the uplink data and the reception quality information having a size of "10" whatever number of resource blocks and/or transport block size are allocated by the L1/L2 grant.

Additionally, in case that the amount of resources calculated in mapping the reception quality information exceed the keeping amount of resources, in which the reception quality information can be mapped, set by the RRC signaling from the base station apparatus, the mobile station apparatus maps the uplink data and the reception quality information, and so that the resource amount does not exceed the keeping amount set by the base station apparatus, by decreasing the resource amount in the time direction for mapping the reception quality information as shown in the form 7, or by decreasing the reduction rate of the uplink data to decrease the proportion of resource amount for mapping the reception quality information as shown in the form 8.

Furthermore, in case that the amount of resources calculated in mapping the reception quality information fall below the keeping amount of resources, in which the reception quality information can be mapped, set by the RRC signaling from the base station apparatus, the mobile station apparatus maps the uplink data and the reception quality information, and so that the resource amount does not fall below the keeping amount set by the base station apparatus, by increasing the resource amount in the time direction for mapping the reception quality information as shown in the form 7, or by increasing the reduction rate of the uplink data to increase the resource amount for the reception quality information as shown in the form 8.

In this way, the base station apparatus transmits the RRC signaling including information (keeping value) indicating a certain amount of resources in which the reception quality information can be mapped. Having received the signal, the mobile station apparatus simultaneously transmits the uplink data and a certain amount of the reception quality information. Hereby, the mobile station apparatus can transmit a certain amount of the reception quality information without depending on resources allocated by the L1/L2 grant.

Figure 9:
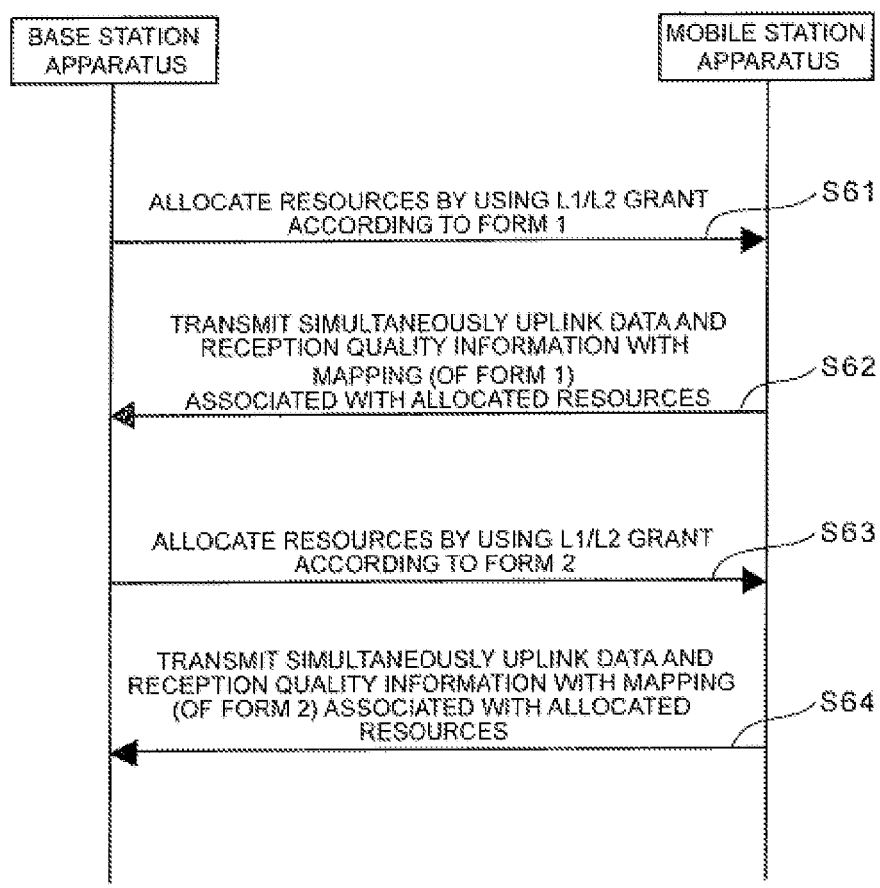
FIG. 9 illustrates a sequence chart of the operations of a base station apparatus and a mobile station apparatus according to the first embodiment of the invention.

FIG. 9 illustrates a sequence chart of operations of a base station apparatus and a mobile station apparatus according to the first embodiment of the invention. First, the base station apparatus allocates resources for the mobile station apparatus to transmit the uplink data by using the L1/L2 grant (step S61). Here, it is assumed that the resources are allocated according to the form 1 in FIG. 3. Next, having received the L1/L2 grant from the base station apparatus, the mobile station apparatus simultaneously transmits the uplink data and the reception quality information with the information mapping (of the form 1, herein) associated with the allocated resources (step S62).

Next, the base station apparatus again allocates resources for the mobile station apparatus to transmit the uplink data by using the L1/L2 grant (step S63). Here, it is assumed that the resources are allocated according to the form 2 in FIG. 3. Next, having received the L1/L2 grant from the base station apparatus, the mobile station apparatus simultaneously transmits the uplink data and the reception quality information with the information mapping (of the form 2, herein) associated with the allocated resources (step S64). Here, the mapping of the uplink data and the reception quality information associated with the resources allocated by the base station apparatus using the L1/L2 grant can be predetermined.

As described above, by predetermining the mapping of the uplink data and the reception quality information in accordance with the resource allocation of the uplink data from the base station apparatus, and by the mobile station apparatus performing the mapping of the uplink data and the reception quality information in accordance with the resource allocation of the uplink data from the base station apparatus, the transmission of control signals to specify the mapping of respective information is unnecessary. As a result, inefficient use of the downlink resources can be reduced. Additionally, since the information mapping in simultaneously transmitting the uplink data and the reception quality information is changed in accordance with the way of allocating the uplink resources, any control signals for changing the mapping of respective information is not needed, and the delay in changing the mapping of respective information can be reduced.

According to the first embodiment, the base station apparatus allocates resources for the uplink data. However, since performing the mapping of the reception quality information simultaneously transmitted with the uplink data in accordance with this resource allocation, as a result, the base station apparatus allocates resources for the uplink data and the reception quality information.

The first embodiment of the invention described above can be applied when the uplink data and the ACK/NACK are transmitted simultaneously. That is, by predetermining the mapping of the uplink data and the ACK/NACK in accordance with the resource allocation of the uplink data from the base station apparatus, and by the mobile station apparatus performing the mapping of the uplink data and the ACK/NACK in accordance with the resource allocation of the uplink data from the base station apparatus, control signals to specify the mapping of respective information (the uplink data and the ACK/NACK) are unnecessary. As a result, inefficient use of the downlink resources can be reduced. Additionally, since the information mapping in simultaneously transmitting the uplink data and the ACK/NACK is changed in accordance with the way of allocating the uplink resources, any control signals for changing the mapping of respective information is not needed, and the delay in changing the mapping of respective information can be reduced.

Second Embodiment

According to a second embodiment, the mobile station apparatus determines modulation scheme and coding rate to be applied to the reception quality information simultaneously transmitted based on modulation scheme and coding rate applied to the uplink data allocated by the base station apparatus using the L1/L2 grant.

The base station apparatus allocates resources for the uplink data by using the L1/L2 grant, and specifies the modulation scheme and the coding rate applied to the uplink data. Having received this signal, the mobile station apparatus determines the modulation scheme and the coding rate to be applied to the reception quality information based on those applied to the uplink data. Note here that the modulation scheme and the coding rate to be applied to the uplink data by the base station apparatus using the L1/L2 grant and those to be applied associated with the reception quality information by the mobile station apparatus can be predetermined.

FIG. 10 illustrates the content of a predefined table in a mobile communication system according to the second embodiment. As shown in FIG. 10, the modulation scheme and the coding rate to be applied to the uplink data by the base station apparatus are associated with those to be applied to the reception quality information. As shown in FIG. 10, it is predetermined in case that the base station apparatus specifies applying modulation scheme QPSK and coding rate 1/8 to the uplink data, then the mobile station apparatus applies modulation scheme QPSK or BPSK and coding rate 1/8 or 1/16 to the reception quality information for transmission. In addition, for example, it is predetermined in case that the base station apparatus specifies applying modulation scheme 16QAM and coding rate 1/4 to the uplink data, then the mobile station apparatus applies modulation scheme 16QAM or QPSK and coding rate 1/4 or 1/8 to the reception quality information for transmission.

That is, for example, by the base station apparatus specifying applying modulation scheme 16QAM and coding rate 1/4 to the uplink data, then the uplink data to which modulation scheme 16QAM and coding rate 1/4 are applied and the reception quality information to which modulation scheme 16QAM or QPSK and coding rate 1/4 or 1/8 are applied are simultaneously transmitted from the mobile station apparatus. Note here that the coding rate applied to the uplink data and the coding rate applied to the reception quality information can be calculated from the modulation scheme and the transport block size to be transmitted. That is, the modulation scheme and the transport blocks to be transmitted can be predefined.

This association between the modulation scheme and the coding rate of the uplink data and those of the reception quality information can be mapped in advance in one-to-one or one-to-many manner. For one-to-many manner mapping, the blind decoding described below will be applied with multiple modulation schemes and coding rates associated with the modulation scheme and the coding rate of the uplink data on demodulating the reception quality information in the base station apparatus.

Generally, in case that high modulation scheme and high coding rate are used for transmitting information, larger amount of information can be transmitted. On the other hand, in case that low modulation scheme and low coding rate are used, highly reliable information can be transmitted. As described above, by predetermining the modulation scheme and the coding rate applied to the reception quality information associated with those applied to the uplink data by the base station apparatus, the modulation scheme and the coding rate of the reception quality information simultaneously transmitted with the uplink data can comply with those of the uplink data, improving probability of successful transmission of the reception quality information.

When specifying the modulation scheme and the coding rate to be applied to the uplink data by using the L1/L2 grant for the mobile station apparatus, the base station apparatus can decode respective information based on the modulation scheme and the coding rate of the reception quality information because the base station apparatus knows in advance the modulation scheme and the coding rate of the reception quality information simultaneously transmitted with the uplink data. Note here that in case that the association between the modulation scheme and the coding rate of the uplink data and those of the reception quality information is mapped in one-to-many manner, the decoding will be attempted for all possible modulation schemes and coding rates (blind decoding), and then the results will be checked by the cyclic redundancy check (CRC) for correct modulation. The base station apparatus applies adaptive modulation and coding and/or frequency selective scheduling to the downlink data base on the correctly demodulated reception quality information.

Figure 11:
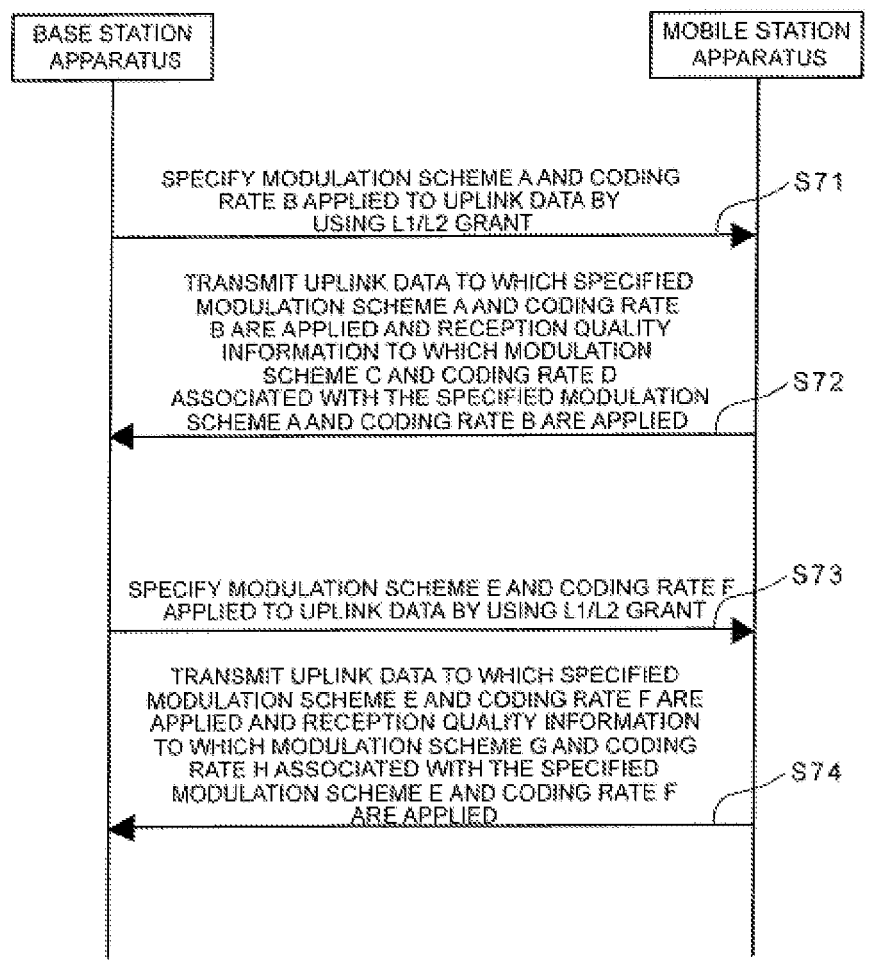
FIG. 11 illustrates a sequence chart of the operations of a base station apparatus and a mobile station apparatus according to the second embodiment of the invention.

FIG. 11 illustrates a sequence chart of operations of a base station apparatus and a mobile station apparatus according to the second embodiment of the invention. First, the base station apparatus specifies the modulation scheme and the coding rate applied to the uplink data by using L1/L2 grant (step S71). Here, it is assumed that modulation scheme A and coding rate B are specified as the modulation scheme and the coding rate applied to the uplink data. Next, having received the L1/L2 grant from the base station apparatus applies, the mobile station apparatus applies modulation scheme and coding rate associated with the modulation scheme A and the coding rate B to the reception quality information. Here, it is assumed that modulation scheme C and coding rate D are applied to the reception quality information associated with the modulation scheme A and the coding rate B, respectively. Then, the mobile station apparatus simultaneously transmits, to the base station apparatus, the uplink data to which the modulation scheme A and the coding rate B are applied and the reception quality information to which the modulation scheme C and the coding rate D are applied (step S72).

Next, the base station apparatus again specifies modulation scheme and coding rate applied to the uplink data by using the L1/L2 grant (step S73). Here, it is assumed that modulation scheme E and coding rate F are specified as the modulation scheme and the coding rate applied to the uplink data. Next, having received the L1/L2 grant from the base station apparatus, the mobile station apparatus applies modulation scheme and coding rate associated with the modulation scheme E and coding rate F to the reception quality information. Here, it is assumed that modulation scheme G and coding rate H are applied to the reception quality information associated with the modulation scheme E and coding rate F, respectively. Then, the mobile station apparatus simultaneously transmits, to the base station apparatus, the uplink data to which the modulation scheme E and the coding rate F are applied and the reception quality information to which the modulation scheme G and the coding rate H are applied (step S74). Here, the modulation scheme and the coding rate of the reception quality information associated with those applied to the uplink data by the base station apparatus using the L1/L2 grant are predetermined.

As described above, the modulation scheme and the coding rate of the reception quality information simultaneously transmitted with the uplink data are predetermined in accordance with those applied to the uplink data specified by the base station apparatus, and the mobile station apparatus can apply the modulation scheme and the coding rate to the reception quality information in accordance with the specification of the modulation scheme and the coding rate to be applied to the uplink data. As a result, the reception quality information transmitted from the mobile station apparatus to the base station apparatus can comply with the modulation scheme and the coding rate of the uplink data, improving probability of successful transmission of the reception quality information.

According to the second embodiment, the base station apparatus specifies the modulation scheme and the coding rate to be applied to the uplink data. However, as the modulation scheme and the coding rate of the reception quality information simultaneously transmitted with the uplink data can also be specified accordingly, the base station apparatus specifies the modulation scheme and the coding rate of the uplink data and the reception quality information as a result.

The second embodiment of the invention described above can be applied also when the uplink data and the ACK/NACK are simultaneously transmitted. That is, by predetermining the modulation scheme and the coding rate of the ACK/NACK simultaneously transmitted with the uplink data in accordance with the specification of those to be applied to the uplink data from the base station apparatus, and by the mobile station apparatus applying the modulation scheme and the coding rate to the ACK/NACK in accordance with the specification of those to be applied to the uplink data from the base station apparatus, the ACK/NACK transmitted from the mobile station apparatus to the base station apparatus can comply with the modulation scheme and the coding rate of the uplink data, improving probability of successful transmission of the reception quality information.

Third Embodiment

Figure 12:
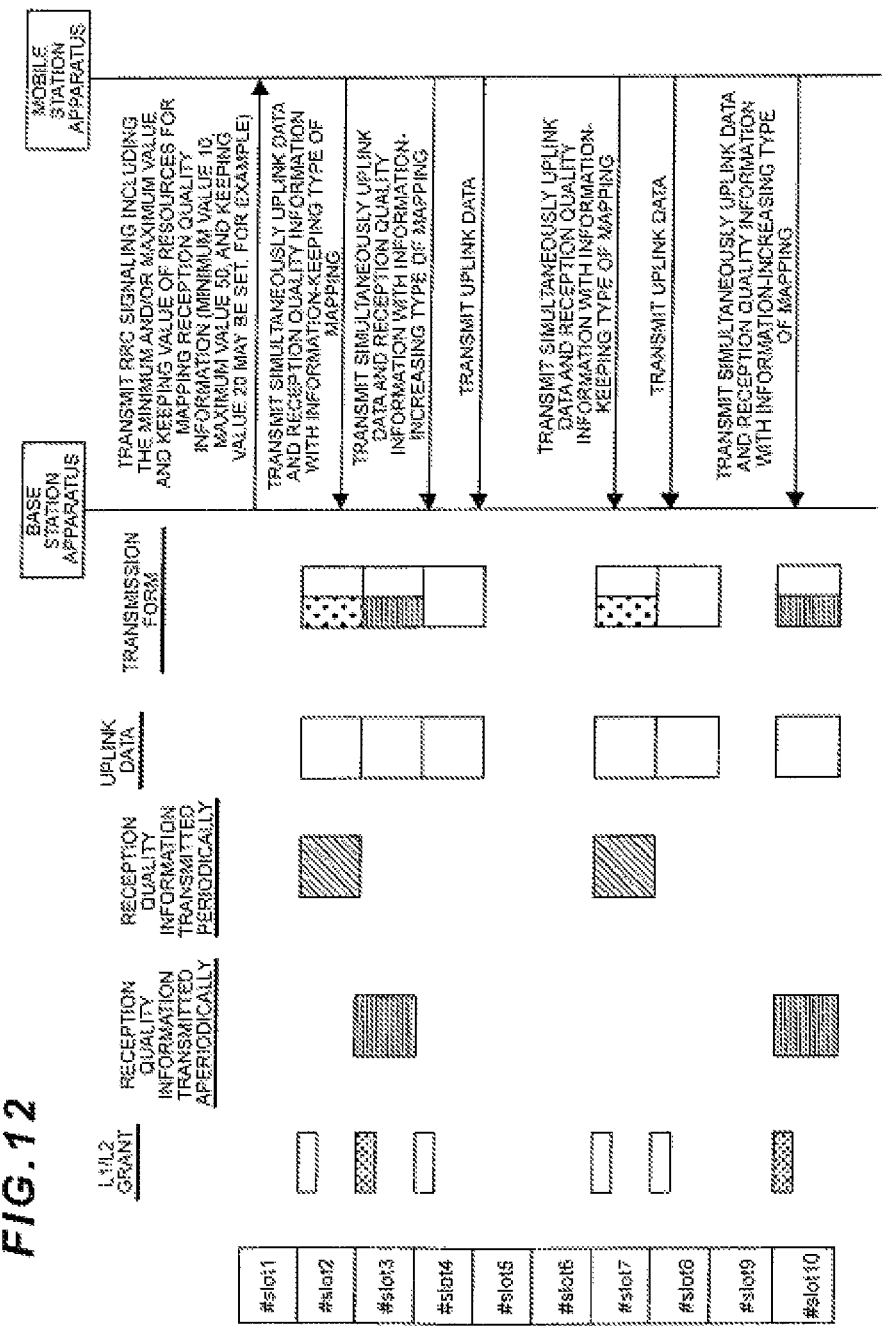
FIG. 12 is a diagram illustrating a third embodiment of the invention.
Figure 14:
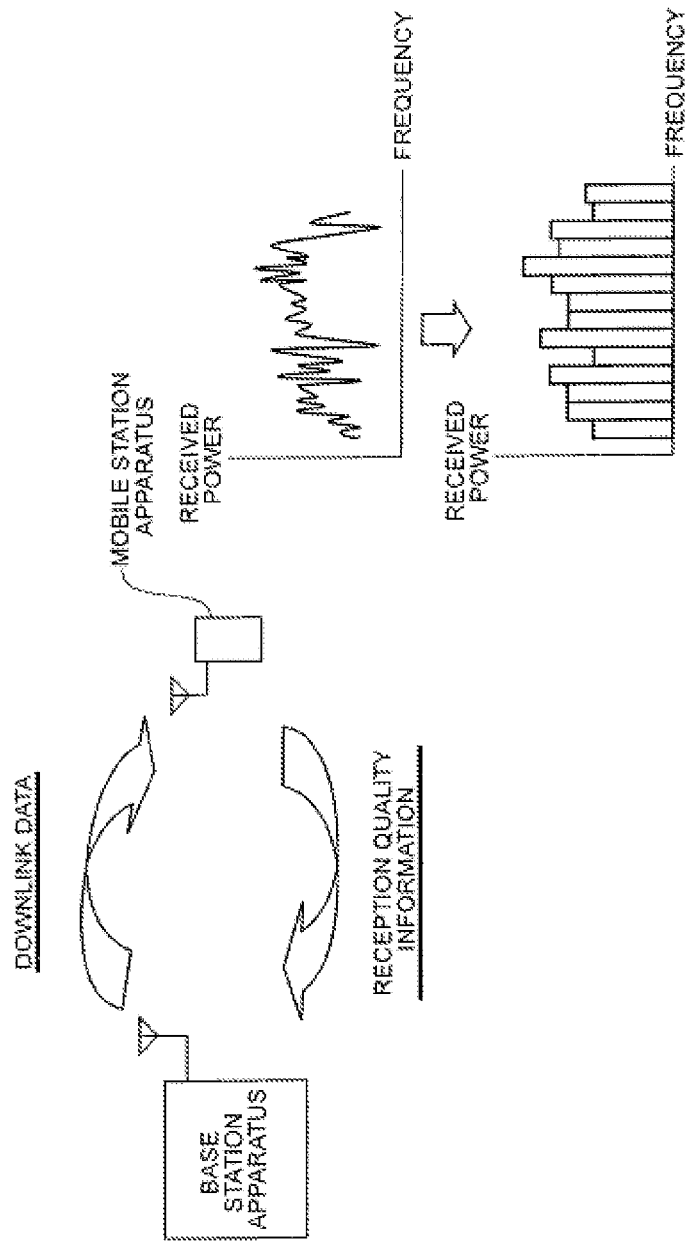
FIG. 14 is a diagram illustrating a communication method between a base station apparatus and a mobile station apparatus of the prior art.

In view of the first and second embodiments described above, a specific operational example of the base station apparatus and the mobile station apparatus will be described as a third embodiment. FIG. 12 illustrates the L1/L2 grant transmitted from the base station apparatus to the mobile station apparatus, reception quality information aperiodically transmitted, reception quality information periodically transmitted, uplink data from the mobile station apparatus to the base station apparatus, and a transmission form for simultaneously transmitting the uplink data or the uplink data and the reception quality information. A periodical transmission of the reception quality information from the mobile station apparatus to the base station apparatus can be achieved, for example, by the base station apparatus transmitting the L1/L2 grant including one-bit information, by the mobile station apparatus transmitting the reception quality information to the base station apparatus after having received the signal. Meanwhile, periodical transmission of the reception quality information from the mobile station apparatus to the base station apparatus can be achieved, for example, by the base station apparatus transmitting the RRC signaling including information setting periodicity for transmitting the reception quality information from the base station apparatus to the mobile station apparatus, by the mobile station apparatus transmitting the reception quality information with the set periodicity to the base station apparatus after having received the signal. FIG. 12 illustrates, as an example, operations of the slots 1 to 10. Also, on the right side of FIG. 12 is shown a processing flow of each slot. In this figure, for clarity of processing flows, only some arrows are illustrated, that is, an arrow related to the slot 1 shows a processing flow from the base station apparatus, and other arrows related to other slots show the processing flows from the mobile station apparatus, which will be described in detail below.

FIG. 13 illustrates a predefined table of modulation scheme and coding rate utilized in the third embodiment. The mobile station apparatus, for which modulation scheme and coding rate are specified for the uplink data by the L1/L2 grant from the base station apparatus, applies modulation scheme and coding rate to the reception quality information by using the table defined in FIG. 13. For example, if the base station apparatus specifies modulation scheme QPSK and coding rate 1/8 of the uplink data, then the mobile station apparatus applies modulation scheme BPSK and coding rate 1/4 to the reception quality information.

Turning back to FIG. 12, operations of each slot will be described. A base station apparatus transmits the RRC signaling including the minimum amount and/or the maximum amount and the keeping amount of resources in which the reception quality information can be mapped for the mobile station apparatus to simultaneously transmit the uplink data and the reception quality information. For clarity of explanation, the minimum value, the maximum value and the keeping value of information amount, in which the reception quality information can be mapped, are set to 10, 50, and 20 respectively. Here, those values are set only as an example, the minimum value and/or the maximum value and the keeping value of resources, in which the reception quality information can be mapped, can be set, for example, by using the number of modulation symbols, the number of resource elements for mapping the reception quality information, and the information amount (the number of bits) of the reception quality information, before mapping the reception quality information onto the resource elements. In addition, in the slot 1, all of the minimum value and/or the maximum value and the keeping value are not necessarily be set.

The slot 2 is a slot which is set in advance by the base station apparatus to transmit the reception quality information periodically. At the slot 2, by using the L1/L2 grant, the base station apparatus allocates resources used for the mobile station apparatus to transmit the uplink data. Having received this signal, the mobile station apparatus simultaneously transmits the uplink data and the reception quality information with the information-keeping type of mapping method by using the allocated resources.

Furthermore, the operation of the mobile station apparatus at the slot 2 will be described. At the slot 2, the mobile station apparatus transmits, to the base station apparatus, the uplink data and the reception quality information with the information-keeping type of mapping method. The information-keeping type of mapping method is a mapping method to transmit a certain amount of the reception quality information with the keeping amount set by the RRC signaling.

Specifically, herein, the keeping value in which the reception quality information can be mapped is set to 20 by the RRC signaling from the base station apparatus. In this case, by using the L1/L2 grant, the base station apparatus sets to use one resource block as resources, modulation scheme QPSK, and coding rate 1/8 for transmitting the uplink data. Referring to the table shown in FIG. 13, this means modulation scheme and coding rate of the reception quality information are set to BPSK and 1/16, respectively. With this control from the base station apparatus, the mobile station apparatus transmits, by using one resource block, the uplink data to which modulation scheme QPSK and coding rate 1/8 are applied, and the reception quality information with a size of 20 to which modulation scheme BPSK and coding rate 1/16 are applied. Therefore, the amount of resources used for this reception quality information is 320 (i.e., 20*1*16).

Also, by using the L1/L2 grant, the base station apparatus sets to use two resource blocks as resources, modulation scheme QPSK, and coding rate 1/8 for transmitting the uplink data. Referring to the table shown in FIG. 13, this means modulation scheme and coding rate of the reception quality information are set to BPSK and 1/16, respectively. That is, with this control from the base station apparatus, the mobile station apparatus transmits, by using two resource blocks, the uplink data to which modulation scheme QPSK and coding rate 1/8 are applied, and the reception quality information with a size of 20 to which modulation scheme BPSK and coding rate 1/16 are applied. Therefore, the amount of resources used for this reception quality information is 320 (i.e., 20*1*16).

Furthermore, by using the L1/L2 grant, the base station apparatus sets to use two resource blocks as resources, modulation scheme QPSK, and coding rate 1/4 for transmitting the uplink data. Referring to the table shown in FIG. 13, this means modulation scheme and coding rate of the reception quality information are set to BPSK and 1/8, respectively. That is, with this control from the base station apparatus, the mobile station apparatus transmits, by using two resource blocks, the uplink data to which modulation scheme QPSK and coding rate 1/4 are applied, and the reception quality information with a size of 20 to which modulation scheme BPSK and coding rate 1/8 are applied. Therefore, the amount of resources used for transmitting this reception quality information will be 160 (i.e., 20*1*8).

The slot 3 is a slot which is set by the base station apparatus to transmit the reception quality information aperiodically. The slot is also set by controlling from the base station apparatus to transmit the reception quality information in a triggered manner. At the slot 3, by using the L1/L2 grant, the base station apparatus allocates resources used for the mobile station apparatus to transmit the uplink data. Having received this signal, the mobile station apparatus simultaneously transmits the uplink data and the reception quality information with the information-increasing type of mapping method by using the allocated resources.

Furthermore, the operation of the mobile station apparatus at the slot 3 will be described. At the slot 3, the mobile station apparatus transmits, to the base station apparatus, the uplink data and the reception quality information with the information-increasing type of mapping method. The information-increasing type of mapping method is a mapping method to transmit, in accordance with resources allocated by the L1/L2 grant from the base station apparatus, the reception quality information with the amount of resources for mapping the reception quality information being increased in the range of the minimum value and/or the maximum value set by the RRC signaling.

Specifically, herein, the minimum value and the maximum value, in which the reception quality information can be mapped, are set to 10 and 250 respectively by the RRC signaling from the base station apparatus (herein, the minimum value and the maximum value are set with modulation scheme BPSK and coding rate 1/16). In this case, by using the L1/L2 grant, the base station apparatus sets to use one resource block as resources, modulation scheme QPSK, and coding rate 1/8 for transmitting the uplink data. Referring to the table shown in FIG. 13, this means modulation scheme and coding rate of the reception quality information are set to BPSK and 1/16, respectively. With this control from the base station apparatus, the mobile station apparatus transmits, by using one resource block, the uplink data to which modulation scheme QPSK and coding rate 1/8 are applied, and the reception quality information with a size of 10 (10*1*1*(1/16)/(1/16)) to which modulation scheme BPSK and coding rate 1/16 are applied. Therefore, the amount of resources used for this reception quality information is 160 (i.e., 10*1*16).

Also, by using the L1/L2 grant, the base station apparatus sets to use three resource blocks as resources for transmitting uplink data, modulation scheme QPSK, and coding rate 1/8. Referring to the table shown in FIG. 13, this means modulation scheme and coding rate of the reception quality information are set to BPSK and 1/16, respectively. That is, with this control from the base station apparatus, the mobile station apparatus transmits, by using three resource blocks, the uplink data to which modulation scheme QPSK and coding rate 1/8 are applied, and the reception quality information with a size of 30 (10*3*1*(1/16)/(1/16)) to which modulation scheme BPSK and coding rate 1/16 are applied. Therefore, the amount of resources used for this reception quality information is 480 (i.e., 30*1*16).

Furthermore, by using the L1/L2 grant, the base station apparatus sets to use three resource blocks as resources, modulation scheme 16QAM, and coding rate 1/4 for transmitting the uplink data. Referring to the table shown in FIG. 13, this means modulation scheme and the coding rate of the reception quality information are set to QPSK and 1/4, respectively. That is, with this control from the base station apparatus, the mobile station apparatus transmits, by using three resource blocks, the uplink data to which modulation scheme 16QAM and coding rate 1/4 are applied, and the reception quality information with a size of 240 (10*3*2*(1/4)/(1/16)) to which modulation scheme QPSK and coding rate 1/4 are applied. Therefore, the amount of resources used for this reception quality information is 480 (i.e., 240*(1/2)*4). Herein, this mapping method is an increasing type of mapping method for resource blocks, modulation scheme, and coding rate.

Alternatively, by using the L1/L2 grant, the base station apparatus sets to use three resource blocks as resources, modulation scheme 16QAM, and coding rate 1/4 for transmitting the uplink data. Referring to the table shown in FIG. 13, this means modulation scheme and coding rate of the reception quality information are set to QPSK and 1/4, respectively. That is, with this control from the base station apparatus, the mobile station apparatus transmits, by using three resource blocks, the uplink data to which modulation scheme 16QAM and coding rate 1/4 are applied, and the reception quality information with a size of 30 (10*3*1*1) to which modulation scheme QPSK and coding rate 1/4 are applied. Therefore, the amount of resources used for this reception quality information is 60 (i.e., 30*(1/2)*4). Herein, this mapping method is an increasing type of mapping method for resource blocks, while a keeping type of mapping method for modulation scheme, and coding rate.

Furthermore, by using the L1/L2 grant, the base station apparatus sets to use four resource blocks as resources, modulation scheme 16QAM, and coding rate 1/4 for transmitting the uplink data. Referring to the table shown in FIG. 13, this means modulation scheme and coding rate of the reception quality information are set to QPSK and 1/4, respectively. That is, with this control from the base station apparatus, the mobile station apparatus transmits, by using four resource blocks, the uplink data to which modulation scheme 16QAM and coding rate 1/4 are applied, and the reception quality information with a size of 320 (10*4*2*(1/4)/(1/16)) to which modulation scheme QPSK and coding rate 1/4 are applied. However, as the maximum value of resources, in which the reception quality information can be mapped, is set to 250 by the RRC signaling from the base station apparatus, the mobile station apparatus transmits, to the base station apparatus, the reception quality information with a size of 250. Therefore, the amount of resources used for the reception quality information is 500 (i.e., 250*(1/2)*4).

At the slot 4 in FIG. 12, the base station apparatus transmits the normal L1/L2 grant. Having received the signal, the mobile station apparatus transmits, to the base station apparatus, the uplink data. Similar operation will be done at the slot 8.

Similar to the slot 2, the slot 7 is a slot which is set in advance by the base station apparatus to transmit the reception quality information periodically. At the slot 7, using the L1/L2 grant, the base station apparatus allocates resources used for the mobile station apparatus to transmit the uplink data. Having received this signal, the mobile station apparatus simultaneously transmits the uplink data and the reception quality information with the information-keeping type of mapping method by using the allocated resources. The information-keeping type of mapping method is similar to that of the slot 2.

Similar to the slot 3, the slot 10 is a slot which is set by the base station apparatus to transmit the reception quality information aperiodically. The slot is also set by controlling from the base station apparatus to transmit the reception quality information in a triggered manner. At the slot 10, by using the L1/L2 grant, the base station apparatus allocates resources used for a mobile station apparatus to transmit the uplink data. Having received this signal, the mobile station apparatus simultaneously transmits the uplink data and the reception quality information with the information-increasing type of mapping method by using the allocated resources. The information-increasing type of mapping method is similar to that of the slot 3.

As for the information-keeping type of mapping method performed in the slots 2 and 7, as well as the information-increasing type and information-keeping type of mapping method performed in the slots 3 and 10, the information amount used for the reception quality information and the number of modulation symbols used for the uplink data, for example, can be calculated as shown in the equations below. Let Nrb, Md, and Cd be the number of resource blocks, a symbol rate for modulation scheme, and a coding rate, respectively, allocated by the L1/L2 grant for transmitting the uplink data. Additionally, let Mc and CC be a symbol rate for modulation scheme and coding rate of the reception quality information, respectively, set with a predefined table such as shown in FIG. 13. Further, let MaxR, MinR (in the case of using a symbol rate Mo and coding rate Co), and ConR be the maximum value, the minimum value and the keeping value of the information amount, respectively, in which the reception quality information can be mapped, are set by the RRC signaling from the base station apparatus. Herein, the minimum value, the maximum value and the keeping value of resources, in which the reception quality information can be mapped, are set as the information amount of the reception quality information, for example, the resources can be set with the number of modulation symbols, or the number of resource elements for mapping the reception quality information before the reception quality information being mapped onto the resource elements.

First, the information-increasing type of mapping method can be defined with the following equation. The symbol rate Mc for modulation scheme and the coding rate Cc of the reception quality information can be defined as a function of the symbol rate Md and the coding rate Cd for the uplink data, and predefined with a table based on the specification and so on such as shown in FIG. 13:

$$(Mc,Cc)=f(Md,Cd)$$

Therefore, the number of modulation symbols Ncs used for the reception quality information from the mobile station apparatus can be represented using the Mc and the Cc as follows:

$$Ncs=Bc*Mc*1/Cc*\alpha$$

Here, as the information-increasing type of mapping method is a mapping method to transmit the reception quality information with the information amount of the reception quality information being increased in the range of the minimum value and/or the maximum value, which are set by the RRC signaling from the base station apparatus, the Bc can be defined as follows:

$$BC=\text{MAXMIN}(\text{Max}R,\text{Min}R*Nrb*Mc*1/Cc*1/Mo*Co,\text{Min}R)$$

That is, the number of modulation symbols Nds used for the uplink data can be represented as follows:

$$Nds=Nrb*168-Ncs-\gamma$$

Where α, β, γ are coefficients and vary with other factors, such as the number of reference symbols included in resource blocks, or the spreading ratios applied to information, etc.

Subsequently, the information-keeping type of mapping method can be defined with the following equation. The symbol rate Mc for modulation scheme and the coding rate Cc of the reception quality information can be defined as a function of the symbol rate Md and the coding rate Cd for the uplink data and predefined with a table such as shown in FIG. 13:

$$(Mc,Cc)=f(Md,Cd)$$

Therefore, the number of modulation symbols Ncs used for the reception quality information from the mobile station apparatus can be represented using Mc and Cc as follows:

$$Ncs=ConR*Mc*1/Cc*\beta$$

Here, as the information-keeping type of mapping method is a mapping method to transmit the reception quality information with a certain information amount of the reception quality information by the keeping value, which is set by the RRC signaling from the base station apparatus, the Bc can be defined as follows:

$$BC=ConR$$

That is, the number of modulation symbols Nds used for the uplink data can be represented as follows:

$$Nds=Nrb*168-Ncs-\gamma$$

where α, β, γ are coefficients and vary with other factors, such as the number of reference symbols included in resource blocks, or the spreading ratios applied to information, etc.

In this way, the base station apparatus transmits the RRC signaling including information indicating the minimum amount and/or the maximum amount of resources in which the reception quality information can be mapped. Having received the signal, the mobile station apparatus changes the mapping of the uplink data and the reception quality information, and simultaneously transmits them. Hereby, even when the resources for transmitting the reception quality information calculated based on the L1/L2 grant is larger (i.e., when the uplink data having larger information amount is transmitted), the transmission of the reception quality information with a certain amount or more (i.e., the reception quality information having too large information amount) by the mobile station apparatus can be avoided, and significant increase of overhead of the uplink caused by the transmission of the reception quality information can be avoided. Also, even when the resources for transmitting the reception quality information calculated based on the L1/L2 grant is smaller (i.e., when the uplink data having smaller information amount is transmitted), the mobile station apparatus can transmit the reception quality information with a certain amount or more (the reception quality information set by the minimum amount), and the quality of the reception quality information can be maintained above a certain level. Moreover, by setting the minimum amount that can be calculated based on the L1/L2 grant as the minimum amount, the transmission of the reception quality information that falls below the minimum amount by the mobile station apparatus can be avoided. Here, by defining an equation for the resources for transmitting the reception quality information not to exceed the maximum amount and not to fall below the minimum amount, each of which can be calculated based on the L1/L2 grant, the maximum amount or the minimum amount need not to be set by using the RRC signaling.

Also, the base station apparatus transmits the RRC signaling including information indicating the keeping value of resources in which the reception quality information can be mapped. Having received the signal, the mobile station apparatus simultaneously transmits the uplink data and a certain amount of the reception quality information. Hereby, the mobile station apparatus can transmit a certain amount of the reception quality information without depending on resources allocated by the L1/L2 grant.

Also, by the mobile station apparatus applying the information-keeping type of mapping method in transmitting the uplink data and periodic reception quality information, a certain amount of the reception quality information can be periodically transmitted to the base station apparatus. Meanwhile, by the mobile station apparatus applying the information-increasing type of mapping method in transmitting the uplink data and aperiodic reception quality information, the reception quality information comply with resources allocated by the L1/L2 grant can be transmitted to the base station apparatus.

According to the first and second embodiments of the invention described above, the base station apparatus can transmit control information for specifying a transmission format (resource information (mapping onto resource element) and/or modulation scheme and/or coding rate) of information (uplink data and/or reception quality information and/or HARQ ACK/NACK) transmitted in the uplink, while the mobile station apparatus can transmit, to the base station apparatus, information in the uplink based on the transmission format specified by the base station apparatus.

As described above, the mobile station apparatus according to the embodiments is directed to the mobile station apparatus in the mobile communication system where the mobile station apparatus transmits, to the base station apparatus, the reception quality information indicating quality of signals received from the base station apparatus, wherein the mobile station apparatus calculates, from information amount of the reception quality information and modulation scheme and coding rate of the uplink data, number of symbols for the reception quality information, and transmits, to the base station apparatus, the reception quality information with the calculated number of symbols together with the uplink data.

In addition, in the mobile station apparatus of the embodiment, the reception quality information is mapped to a lower frequency for resources allocated by the base station apparatus.

In addition, the mobile station apparatus according to the embodiments is directed to the mobile station apparatus in the mobile communication system where the mobile station apparatus transmits, to a base station apparatus, the ACK/NACK of the HARQ for downlink data, wherein the mobile station apparatus calculates, from information amount of the ACK/NACK and modulation scheme and coding rate of the uplink data, number of symbols for the ACK/NACK, and transmits, to the base station apparatus, the ACK/NACK with the calculated number of symbols together with the uplink data.

In addition, the mobile station apparatus according to the embodiment is directed to the mobile station apparatus in the mobile communication system where the mobile station apparatus transmits, to a base station apparatus, the reception quality information indicating quality of signals received from the base station apparatus, wherein the mobile station apparatus keeps information amount for the reception quality information constant without depending on resources allocated by the base station apparatus, calculates number of symbols for the reception quality information according to control information for the uplink data specified by the base station apparatus, and transmits, to the base station apparatus, the reception quality information with the calculated number of symbols together with the uplink data.

In addition, the mobile station apparatus according to the embodiment is directed to the mobile station apparatus in the mobile communication system where the mobile station apparatus transmits, to the base station apparatus, the ACK/NACK of the HARQ for downlink data, wherein the mobile station apparatus keeps information amount for the ACK/NACK constant without depending on resources allocated by the base station apparatus, calculates number of symbols for the ACK/NACK according to control information for the uplink data specified by the base station apparatus, and transmits, to the base station apparatus, the ACK/NACK with the calculated number of symbols together with the uplink data.

In addition, the mobile communication system according to the embodiment is directed to the mobile communication system where the mobile station apparatus measures the reception quality of signals received from the base station apparatus, and transmits, to the base station apparatus, the reception quality information, while the base station apparatus allocates, to the mobile station apparatus, resources based on the reception quality information received from the mobile station apparatus, wherein the base station apparatus transmits, to the mobile station apparatus, control information for specifying a transmission format for the mobile station apparatus to transmit information by using the uplink, the mobile station apparatus transmits, to the base station apparatus, the uplink data and the reception quality information together based on the specified transmission format in case of having received the control information from the base station apparatus.

In addition, in the mobile communication system of the embodiment, the transmission format of information to be transmitted by using the uplink is that of the uplink data.

In this way, as the base station apparatus transmits, to the mobile station apparatus, control information for specifying a transmission format for the mobile station apparatus to transmit information by using the uplink, and the mobile station apparatus transmits, to the base station apparatus, the uplink data and the reception quality information together based on the specified transmission format in case of having received the control information from the base station apparatus, the transmission of any control signals for specifying the mapping of respective information can be omitted, and the downlink resources can be effectively utilized. Additionally, as the transmission format is specified based on the way of allocating uplink resources, the mapping of the uplink data and the reception quality information can be changed, and the transmission of control signals for changing the mapping of respective information can be omitted. As a result, any delay occurring in changing the mapping of respective information can be reduced.

In addition, in the mobile communication system of the embodiment, the base station apparatus transmits, to the mobile station apparatus, as the control information, resource information specified by frequency component and time component, and the mobile station apparatus transmits, to the base station apparatus, the uplink data and the reception quality information together in a transmission format based on mapping of the uplink data and the reception quality information, which is associated with the resource information received from the base station apparatus.

In this way, by transmitting resource information specified by frequency component and time component to the mobile station apparatus, the transmission format for the mobile station apparatus to transmit, to the base station apparatus, the uplink data and the reception quality information together can specified. Hereby, the transmission of any control signals for specifying the mapping of respective information can be omitted, and the downlink resources can be effectively utilized.

In addition, in the mobile communication system of the embodiment, the base station apparatus transmits, to the mobile station apparatus, as the control information, information for specifying modulation scheme and coding rate of the uplink data, and the mobile station apparatus identifies modulation scheme and coding rate of the reception quality information, which are associated with the information for specifying modulation scheme and coding rate of the uplink data received from the base station apparatus, and transmits, to the base station apparatus, the uplink data to which the modulation scheme and the coding rate of the information for specifying modulation scheme and coding rate received from the base station apparatus are applied, together with the reception quality information to which the identified modulation scheme and coding rate are applied.

In this way, the base station apparatus transmits, to the mobile station apparatus, as the control information, information for specifying modulation scheme and coding rate of the uplink data, while the mobile station apparatus identifies modulation scheme and coding rate of the reception quality information, which are associated with the information for specifying modulation scheme and coding rate of the uplink data received from the base station apparatus, and transmits, to the base station apparatus, the uplink data to which the modulation scheme and the coding rate of the information for specifying modulation scheme and coding rate received from the base station apparatus are applied, together with the reception quality information to which the identified modulation scheme and coding rate are applied. Thereby, the reception quality information transmitted from the mobile station apparatus to the base station apparatus can comply with the modulation scheme and the coding rate of the uplink data, improving probability of successful transmission of the reception quality information.

In addition, the mobile communication system according to the embodiment is directed to the mobile communication system where the base station apparatus allocates, to a mobile station apparatus, resources wherein the base station apparatus transmits, to the mobile station apparatus, control information for specifying a transmission format for the mobile station apparatus to transmit information by using the uplink, and the mobile station apparatus transmits, to the base station apparatus, the uplink data and the ACK/NACK together based on the specified transmission format in case of having received the control information from the base station apparatus.

In addition, in the mobile communication system of the embodiment, the transmission format of information to be transmitted by using the uplink is that of the uplink data.

In this way, as a base station apparatus transmits, to a mobile station apparatus, control information for specifying a transmission format for the mobile station apparatus to transmit information, and the mobile station apparatus transmits, to the base station apparatus, the uplink data and the ACK/NACK together based on the specified transmission format in case of having received the control information from the base station apparatus, the transmission of any control signals for specifying the mapping of respective information can be omitted, and the downlink resources can be effectively utilized. Additionally, as the transmission format is specified based on the way of allocating uplink resources, the mapping of the uplink data and the ACK/NACK can be changed, and the transmission of control signals for changing the mapping of respective information can be omitted. As a result, any delay occurring in changing the mapping of respective information can be reduced.

In addition, in the mobile communication system of the embodiment, the base station apparatus transmits, to the mobile station apparatus, as the control information, resource information specified by frequency component and time component, and the mobile station apparatus transmits, to the base station apparatus, the uplink data and the ACK/NACK together in a transmission format based on mapping of the uplink data and the ACK/NACK, which is associated with the resource information received from the base station apparatus.

In this way, by transmitting resource information specified from frequency component and time component to the mobile station apparatus, the transmission format for the mobile station apparatus to transmit, to the base station apparatus, the uplink data and the ACK/NACK together can be specified. Hereby, the transmission of any control signals for specifying the mapping of respective information can be omitted, and the downlink resources can be effectively utilized.

In addition, in the mobile communication system of the embodiment, the base station apparatus transmits, to the mobile station apparatus, as the control information, information for specifying modulation scheme and coding rate of the uplink data, and the mobile station apparatus identifies modulation scheme and coding rate of the ACK/NACK, which are associated with the information for specifying modulation scheme and coding rate of the uplink data received from the base station apparatus, and transmits, to the base station apparatus, the uplink data to which the modulation scheme and the coding rate of the information for specifying modulation scheme and coding rate received from the base station apparatus are applied, together with the ACK/NACK to which the identified modulation scheme and coding rate are applied.

In this way, the base station apparatus transmits, to the mobile station apparatus, as the control information, information for specifying modulation scheme and coding rate of the uplink data, and the mobile station apparatus identifies modulation scheme and coding rate of the ACK/NACK, which are associated with the information for specifying modulation scheme and coding rate of the uplink data received from the base station apparatus, and transmits, to the base station apparatus, the uplink data to which the modulation scheme and the coding rate received from the base station apparatus are applied, together with the ACK/NACK to which the identified modulation scheme and coding rate are applied. Hereby, the ACK/NACK transmitted from the mobile station apparatus to the base station apparatus can comply with the modulation scheme and the coding rate of the uplink data, improving probability of successful transmission of the ACK/NACK.

In addition, the base station apparatus according to the embodiment is directed to the base station apparatus allocates, to a mobile station apparatus, resources, and comprising: a scheduler unit for performing scheduling of, for a mobile station apparatus, including includes control information for specifying a transmission format to transmit the uplink data and the reception quality information together in a transmission signal, and a transmitting unit for transmitting, to the mobile station apparatus, the transmission signal including the control information.

In this way, as the control information for specifying a transmission format for the mobile station apparatus to transmit the uplink data and the reception quality information together is transmitted to the mobile station apparatus, the transmission of any control signals for specifying the mapping of respective information can be omitted, and the downlink resources can be effectively utilized.

In addition, in the base station apparatus of the embodiment, the scheduler unit performs scheduling of including, as the control information, resource information specified by frequency component and time component in the transmission signal.

In this way, as the transmission of resource information specified by frequency component and time component to the mobile station apparatus, the transmission format for the mobile station apparatus to simultaneously transmit, to the base station apparatus, the uplink data and the reception quality information can be specified. Hereby, the transmission of any control signals for specifying the mapping of respective information can be omitted, and the downlink resources can be effectively utilized.

In addition, in the base station apparatus of the embodiment, the scheduler unit performs scheduling of including, as the control information, information for specifying modulation scheme and coding rate of uplink data in the transmission signal.

In this way, as information for specifying modulation scheme and coding rate of the uplink data is transmitted to the mobile station apparatus as the control information, the mobile station apparatus can identify modulation scheme and coding rate of the reception quality information, which are associated with the information, and transmit, to the base station apparatus, the uplink data to which the modulation scheme and the coding rate of the information are applied, together with the reception quality information to which the identified modulation scheme and coding rate are applied. Hereby, the reception quality information transmitted from the mobile station apparatus to the base station apparatus can comply with the modulation scheme and the coding rate of the uplink data, improving probability of successful transmission of the reception quality information.

In addition, the base station apparatus according the embodiment is directed to the base station allocates, to a mobile station apparatus, resources, and comprising: a scheduler unit for performing scheduling of, for a mobile station apparatus, including control information for specifying a transmission format to transmit the uplink data and the ACK/NACK together in a transmission signal, and a transmitting unit for transmitting, to the mobile station apparatus, the transmission signal including the control signal.

In this way, as the control information for specifying a transmission format for a mobile station apparatus to transmit the uplink data and the ACK/NACK together is transmitted to the mobile station apparatus, the transmission of any control signals for specifying the mapping of respective information can be omitted, and the downlink resources can be effectively utilized.

In addition, in the base station apparatus of the embodiment, the scheduler unit performs scheduling of including as the control information, resource information specified by frequency component and time component in the transmission signal.

In this way, as the transmission of resource information specified from frequency component and time component to the mobile station apparatus, the transmission format for the mobile station apparatus to simultaneously transmit, to the base station apparatus, the uplink data and the ACK/NACK can be specified. Hereby, the transmission of any control signals for specifying the mapping of respective information can be omitted, and the downlink resources can be effectively utilized.

In addition, in the base station apparatus of the embodiment, the scheduler unit performs scheduling of including, as the control information, information for specifying modulation scheme and coding rate of uplink data in the transmission signal.

In this way, as information for specifying modulation scheme and coding rate of the uplink data is transmitted to the mobile station apparatus as control information, the mobile station apparatus can identify the modulation scheme and the coding rate of the ACK/NACK, which are associated with the information, and transmit, to the base station apparatus, the uplink data to which the modulation scheme and the coding rate of the information are applied, together with the ACK/NACK to which the identified modulation scheme and coding rate are applied. Hereby, the ACK/NACK transmitted from the mobile station apparatus to the base station apparatus can comply with the modulation scheme and the coding rate of the uplink data, improving probability of successful transmission of the ACK/NACK.

In addition, the mobile station apparatus according to the embodiment is directed to the mobile station apparatus is allocated resources by a base station apparatus, and comprising: a receiving unit for receiving, from the base station apparatus, control information for specifying a transmission format of information to be transmitted using the uplink, and a transmitting unit for transmitting, to the base station apparatus, the uplink data and the reception quality information together based on the specified transmission format in case that the receiving unit has received the control information from the base station apparatus.

In addition, in the mobile station apparatus of the embodiment, the transmission format of information to be transmitted using the uplink is that of the uplink data, and the receiving unit automatically recognizes the transmission format of the reception quality information from that of the uplink data.

In this way, as the mobile station apparatus transmits, to the base station apparatus, the uplink data and the reception quality information together based on the specified transmission format in case of having received the control information from the base station apparatus, the base station apparatus can omit the transmission of any control signals for specifying the mapping of respective information, and the downlink resources can be effectively utilized. Additionally, as the transmission format is specified based on the way of allocating uplink resources, the mapping of the uplink data and the reception quality information can be changed, and the transmission of control signals for changing the mapping of respective information can be omitted. As a result, any delay occurring in changing the mapping of respective information can be reduced.

In addition, in the mobile station apparatus of the embodiment, in case that the receiving unit has received, from the base station apparatus, resource information specified by frequency component and time component as the control information, the transmitting unit transmits, to the base station apparatus, the uplink data and the reception quality information together in the transmission format based on mapping of the uplink data and the reception quality information, which is associated with the resource information.

In this way, in case that resource information specified by frequency component and time component is received from the base station apparatus, the transmission format for transmitting the uplink data and the reception quality information together to the base station apparatus can be specified. Hereby, the base station apparatus can omit the transmission of any control signals for specifying the mapping of respective information, and the downlink resources can be effectively utilized.

In addition, in the mobile station apparatus of the embodiment, in case that the receiving unit has received, from the base station apparatus, information for specifying modulation scheme and coding rate of the uplink data as the control information, the transmitting unit identifies modulation scheme and coding rate of the reception quality information, which are associated with the information for specifying modulation scheme and coding rate of the uplink data received from the base station apparatus, and transmits, to the base station apparatus, the uplink data to which the modulation scheme and coding rate of the information for specifying modulation scheme and coding rate received from the base station apparatus are applied, together with the reception quality information to which the identified modulation scheme and coding rate are applied.

In this way, in case of receiving, from the base station apparatus, information for specifying modulation scheme and coding rate of the uplink data as the control information, the mobile station apparatus can identify modulation scheme and coding rate of the reception quality information, which are associated with the information, and transmit, to the base station apparatus, the uplink data to which the modulation scheme and coding rate of the control information are applied, together with the reception quality information to which the identified modulation scheme and coding rate are applied. Hereby, the reception quality information transmitted from the mobile station apparatus to the base station apparatus can comply with the modulation scheme and the coding rate of the uplink data, improving probability of successful transmission of the reception quality information.

In addition, the mobile station apparatus according to the embodiment is directed to the mobile station apparatus is allocated resources by the base station apparatus, and comprising: a receiving unit for receiving, from the base station apparatus, control information for specifying a transmission format of information to be transmitted using the uplink, and a transmitting unit for transmitting, to the base station apparatus, the uplink data and the ACK/NACK together based on the specified transmission format in case that the receiving unit has received the control information from the base station apparatus.

In addition, in the mobile station apparatus of the embodiment, the transmission format of information to be transmitted using the uplink is that of the uplink data and that of the ACK/NACK.

In addition, in the mobile station apparatus of the embodiment, the transmission format of information to be transmitted using the uplink is that of the uplink data, and the receiving unit automatically recognizes the transmission format of the ACK/NACK from that of the uplink data.

In this way, as the mobile station apparatus transmits, to the base station apparatus, the uplink data and the ACK/NACK together based on the specified transmission format in case of having received the control information from the base station apparatus, the base station apparatus can omit the transmission of any control signals for specifying the mapping of respective information, and the downlink resources can be effectively utilized. Additionally, as the transmission format is specified based on the way of allocating uplink resources, the mapping of the uplink data and the ACK/NACK can be changed, and the transmission of control signals for changing the mapping of respective information can be omitted. As a result, any delay occurring in changing the mapping of respective information can be reduced.

In addition, in the mobile station apparatus of the embodiment, in case that the receiving unit has received, from the base station apparatus, resource information specified by frequency component and time component as the control information, the transmitting unit transmits, to the base station apparatus, uplink data and ACK/NACK together in the transmission format based on mapping of uplink data and ACK/NACK, which is associated with the resource information.

In this way, in case that resource information specified by frequency component and time component is received from the base station apparatus, the transmission format for transmitting the uplink data and the ACK/NACK together to the base station apparatus can be specified. Hereby, the base station apparatus can omit the transmission of any control signals for specifying the mapping of respective information, and the downlink resources can be effectively utilized.

In addition, in the mobile station apparatus of the embodiment, in case that the receiving unit has received, from the base station apparatus, information for specifying modulation scheme and coding rate of uplink data as the control information, the transmitting unit identifies modulation scheme and coding rate of ACK/NACK, which are associated with the information for specifying modulation scheme and coding rate of uplink data received from the base station apparatus, and transmits, to the base station apparatus, uplink data to which the modulation scheme and coding rate of the information for specifying modulation scheme and coding rate received from the base station apparatus are applied, together with ACK/NACK to which the identified modulation scheme and coding rate are applied.

In this way, in case of receiving, from the base station apparatus, information for specifying modulation scheme and coding rate of the uplink data as the control information, the mobile station apparatus can identify modulation scheme and coding rate of the ACK/NACK, which are associated with the information, and transmit, to the base station apparatus, the uplink data to which the modulation scheme and the coding rate of the information are applied, together with the ACK/NACK to which the identified modulation scheme and coding rate are applied. Hereby, the ACK/NACK transmitted from the mobile station apparatus to the base station apparatus can comply with the modulation scheme and the coding rate of the uplink data, improving probability of successful transmission of the ACK/NACK.

Although various embodiments of the present invention have been described in detail above with reference to the drawings, the specific configuration thereof is not limited to the embodiments. Rather, it is intended that the following claims encompass any designs within the spirit or scope of the invention.

1. A mobile communication system where a mobile station apparatus transmits, to a base station apparatus, reception quality information indicating quality of a signal received from the base station apparatus, the mobile communication system comprising:
the base station apparatus, which
transmits, to the mobile station apparatus, the signal for permitting data transmission in an uplink, including resource allocation information for specifying a resources region of an uplink data channel that comprises a time domain and a frequency domain, and
the mobile station apparatus, which
calculates an amount of resources for the reception quality information to be mapped together with uplink data on the uplink data channel, using said resource allocation information, such that the amount of resources does not exceed a predetermined amount; and
transmits, to the base station apparatus, the reception quality information with the calculated amount of resources together with the uplink data using the uplink data channel.

2. A mobile communication system where a mobile station apparatus transmits, to a base station apparatus, reception quality information indicating quality of a signal received from the base station apparatus, the mobile communication system comprising:
the base station apparatus, which
transmits, to the mobile station apparatus, the signal for permitting data transmission in an uplink, including resource allocation information for specifying a resources region of an uplink data channel that comprises a time domain and a frequency domain, and
the mobile station apparatus, which
calculates an amount of resources for the reception quality information to be mapped together with uplink data on the uplink data channel, using said resource allocation information, such that the amount of resources is not below a predetermined amount; and
transmits, to the base station apparatus, the reception quality information with the calculated amount of resources together with the uplink data using the uplink data channel.

3. The mobile communication system according to item 1 or 2, wherein the predetermined value is set by RRC signaling transmitted from the base station apparatus.

4. A mobile station apparatus in a mobile communication system where the mobile station apparatus transmits, to a base station apparatus, reception quality information indicating quality of a signal received from the base station apparatus, the mobile station apparatus comprising:
a unit for receiving, from the base station apparatus, resource allocation information for specifying a resources region of an uplink data channel that comprises a time domain and a frequency domain, included in the signal for permitting data transmission in an uplink;
a unit for calculating an amount of resources for the reception quality information to be mapped together with uplink data on the uplink data channel, using the resource allocation information, such that the amount of resources does not exceed a predetermined amount; and
a unit for transmitting, to the base station apparatus, the reception quality information with the calculated amount of resources together with the uplink data using the uplink data channel.

5. A mobile station apparatus in a mobile communication system where the mobile station apparatus transmits, to a base station apparatus, reception quality information indicating quality of a signal received from the base station apparatus, the mobile station apparatus comprising:
a unit for receiving, from the base station apparatus, resource allocation information for specifying a resources region of an uplink data channel that comprises a time domain and a frequency domain, included in the signal for permitting data transmission in an uplink;
a unit for calculating an amount of resources for the reception quality information to be mapped together with uplink data on the uplink data channel, using the resource allocation information, such that the amount of resources is not below a predetermined amount; and
a unit for transmitting, to the base station apparatus, the reception quality information with the calculated amount of resources together with the uplink data using the uplink data channel.

6. The mobile station apparatus according to item 4 or 5, wherein the predetermined value is set by RRC signaling transmitted from the base station apparatus.

7. A base station apparatus in a mobile communication system where a mobile station apparatus transmits, to the base station apparatus, reception quality information indicating quality of a signal received from the base station apparatus, the base station apparatus comprising:
a unit for transmitting, to the mobile station apparatus, the signal for permitting data transmission in an uplink, including resource allocation information for specifying a resources region of an uplink data channel that comprises a time domain and a frequency domain; and
a unit for receiving, from the mobile station apparatus, the uplink data channel on which the reception quality information is mapped together with uplink data with an amount of resources calculated by the mobile station apparatus, using said resource allocation information, such that the amount of resources does not exceed a predetermined amount, and extracting the reception quality information from the uplink data channel.

8. A base station apparatus in a mobile communication system where a mobile station apparatus transmits, to the base station apparatus, reception quality information indicating quality of a signal received from the base station apparatus, the base station apparatus comprising:
a unit for transmitting, to the mobile station apparatus, the signal for permitting data transmission in an uplink, including resource allocation information for specifying a resources region of an uplink data channel that comprises a time domain and a frequency domain; and
a unit for receiving, from the mobile station apparatus, the uplink data channel on which the reception quality information is mapped together with uplink data with an amount of resources calculated by the mobile station apparatus, using the resource allocation information, such that the amount of resources is not below a predetermined amount, and extracting the reception quality information from the uplink data channel.

9. The base station apparatus according to item 7 or 8, wherein the predetermined value is set by RRC signaling.

10. A communication method of a mobile station apparatus in a mobile communication system where the mobile station apparatus transmits, to a base station apparatus, reception quality information indicating quality of a signal received from the base station apparatus, the communication method comprising:
receiving, from the base station apparatus, resource allocation information for specifying a resources region of an uplink data channel that comprises a time domain and a frequency domain, included in the signal for permitting data transmission in an uplink;

calculating an amount of resources for the reception quality information to be mapped together with uplink data on the uplink data channel, using the resource allocation information, such that the amount of resources does not exceed a predetermined value; and transmitting, to the base station apparatus, the reception quality information with the calculated amount of resources together with the uplink data using the uplink data channel.

11. A communication method of a mobile station apparatus in a mobile communication system where the mobile station apparatus transmits, to a base station apparatus, reception quality information indicating quality of a signal received from the base station apparatus, the communication method comprising:

receiving, from the base station apparatus, resource allocation information for specifying a resources region of an uplink data channel that comprises a time domain and a frequency domain, included in the signal for permitting data transmission in an uplink;

calculating an amount of resources for the reception quality information to be mapped together with uplink data on the uplink data channel, using the resource allocation information, such that the amount of resources is not below a predetermined value; and transmitting, to the base station apparatus, the reception quality information with the calculated amount of resources together with the uplink data using the uplink data channel.

12. The communication method according to item 10 or 11, wherein the predetermined value is set by RRC signaling transmitted from the base station apparatus.

13. A communication method of a base station apparatus in a mobile communication system where a mobile station apparatus transmits, to the base station apparatus, reception quality information indicating quality of a signal received from the base station apparatus, the base station apparatus comprising:

transmitting, to the mobile station apparatus, the signal for permitting data transmission in an uplink, including resource allocation information for specifying a resources region of an uplink data channel that comprises a time domain and a frequency domain; and receiving, from the mobile station apparatus, the uplink data channel on which the reception quality information is mapped together with uplink data with an amount of resources calculated by the mobile station apparatus, using said resource allocation information, such that the amount of resources does not exceed a predetermined amount, and extracting the reception quality information from the uplink data channel.

14. A communication method of a base station apparatus in a mobile communication system where a mobile station apparatus transmits, to the base station apparatus, reception quality information indicating quality of a signal received from the base station apparatus, the communication method comprising:

transmitting, to the mobile station apparatus, the signal for permitting data transmission in an uplink, including resource allocation information for specifying a resources region of an uplink data channel that comprises a time domain and a frequency domain; and receiving, from the mobile station apparatus, the uplink data channel on which the reception quality information is mapped together with uplink data with an amount of resources calculated by the mobile station apparatus, using the resource allocation information, such that the amount of resources is not below a predetermined amount, and extracting the reception quality information from the uplink data channel.

15. The communication method according to item 13 or 14, wherein the predetermined value is set by RRC signaling.

What is claimed is:

1. A mobile station apparatus, comprising:
a receiving circuit, configured to receive a L1/L2 grant from a base station apparatus, the L1/L2 grant indicating an uplink resource allocated to the mobile station apparatus;
a processor, configured to:
when the uplink resource is one resource block, determine, based on a form 1, a quantity of a first set of modulation symbols, wherein the form 1 indicates a first resource allocation for reception quality information;
when the uplink resource is two resource blocks, determine, based on a form 2, a quantity of a second set of modulation symbols, wherein the form 2 indicates a second resource allocation for the reception quality information, and wherein the first set of modulation symbols and the second set of modulation symbols include reception quality information; and
map the reception quality information in the first set of modulation symbols or in the second set of modulation symbols onto the uplink resource; and
a transmitting circuit, configured to transmit a wireless signal to the base station apparatus, the wireless signal including the mapped reception quality information in the first set of modulation symbols or in the second set of modulation symbols, and including uplink data in a third set of modulation symbols in the the uplink resource.

2. The mobile station apparatus according to claim 1, wherein the quantity of the first set of modulation symbols or the quantity of the second set of modulation symbols corresponds to a ratio of a resource amount that can be mapped onto the uplink resource.

3. A base station apparatus, comprising:
a processor, configured to allocate an uplink resource for a mobile station apparatus using a L1/L2 grant, wherein the uplink resource is allocated according to a form indicating a resource allocation for reception quality information, and the L1/L2 grant indicates the uplink resource allocated to the mobile station apparatus;
a transmitting circuit, configured to transmit the L1/L2 grant to the mobile station apparatus; and
a receiving circuit, configured to receive a wireless signal from the mobile station apparatus, the wireless signal including reception quality information in a first set of modulation symbols or in a second set of modulation symbols, and the wireless signal including uplink data in a third set of modulation symbols, wherein the first set of modulation symbols and the third set of modulation symbols are comprised in the uplink resource, or the second set of modulation symbols and the third set of modulation symbols are comprised in the uplink resource;
wherein the reception quality information in the first set of modulation symbols is mapped onto the uplink resource by the mobile station apparatus, and a quantity of the first set of modulation symbols is determined by the mobile station apparatus based on the form, wherein when the uplink resource is one resource block, the form is a form 1, and the form 1 indicates a first resource allocation for the reception quality information, and when the uplink resource is two resource blocks, the form is a form 2, and the form 2 indicates a second resource allocation for the reception quality information.

4. The base station apparatus according to claim 3, wherein the quantity of the first set of modulation symbols or the quantity of the second set of modulation symbols corresponds to a ratio of a resource amount that can be mapped onto the uplink resource.

5. The mobile station apparatus according to claim 2, wherein the ratio of the resource amount that can be mapped onto the uplink resource is a ratio of resource amount for mapping the reception quality information onto the uplink resource.

6. The base station apparatus according to claim 4, wherein the ratio of the resource amount that can be mapped onto the uplink resource is a ratio of a resource amount for mapping the reception quality information onto the uplink resource.

7. A communication method of a mobile station apparatus in a mobile communication system, comprising:
receiving, from a base station apparatus, a L1/L2 grant indicating an uplink resource allocated to the mobile station apparatus;
when the uplink resource is one resource block, determining, based on a form 1, a quantity of a first set of modulation symbols, wherein the form 1 indicates a first resource allocation for reception quality information;
when the uplink resource is two resource blocks, determining, based on a form 2, a quantity of a second set of modulation symbols, wherein the form 2 indicates a second resource allocation for the reception quality information, and wherein the first set of modulation symbols and the second set of modulation symbols include the reception quality information;
mapping the reception quality information in the first set of modulation symbols or the second set of modulation symbols onto the uplink resource; and
transmitting, to the base station apparatus, a wireless signal, wherein the wireless signal includes the mapped reception quality information in the first set of modulation symbols or in the second set of modulation symbols, and wherein the wireless signal also includes uplink data in a third set of modulation symbols in uplink resource.

8. The communication method according to claim 7, wherein the quantity of the first set of modulation symbols or the quantity of the second set of modulation symbols corresponds to a ratio of a resource amount that can be mapped onto the uplink resource.

9. The communication method according to claim 8, wherein the ratio of the resource amount that can be mapped onto the uplink resource is a ratio of a resource amount for mapping the reception quality information onto the uplink resource.

10. A non-transitory computer-readable storage medium comprising instructions for causing a mobile station apparatus to:
receive, from a base station apparatus, a L1/L2 grant indicating an uplink resource allocated to the mobile station apparatus;
when the uplink resource is one resource block, determine, based on a form 1, a quantity of a first set of modulation symbols, wherein the form 1 indicates a first resource allocation for reception quality information;
when the uplink resource is two resource blocks, determining, based on a form 2, a quantity of a second set of modulation symbols, wherein the form 2 indicates a second resource allocation for the reception quality information, and wherein the first set of modulation symbols and the second set of modulation symbols include the reception quality information;
map the reception quality information in the first set of modulation symbols or in the second set of modulation symbols onto the uplink resource; and
transmit, to the base station apparatus, a wireless signal including the mapped reception quality information in the first set of modulation symbols or in the second set of modulation symbols, wherein the wireless signal also includes uplink data in a third set of modulation symbols in the uplink resource.

11. The non-transitory computer-readable storage medium according to claim 10, wherein the quantity of the first set of modulation symbols or the quantity of the second set of modulation symbols corresponds to a ratio of a resource amount that can be mapped onto the uplink resource.

12. The non-transitory computer-readable storage medium according to claim 10, wherein the ratio of the resource amount that can be mapped onto the uplink resource is a ratio of a resource amount for mapping the reception quality information onto the uplink resource.

13. A mobile station apparatus comprising:
a processor, and
a memory coupled with the processor, wherein the memory stores instructions, and when the processor executes the instructions, the instructions cause the mobile station apparatus to:
receive, from a base station apparatus, a L1/L2 grant indicating an uplink resource allocated to the mobile station apparatus;
when the uplink resource is one resource block, determine, based on a form 1, a quantity of a first set of modulation symbols, wherein the form 1 indicates a first resource allocation for reception quality information;
when the uplink resource is two resource blocks, determine, based on a form 2, a quantity of a second set of modulation symbols, wherein the form 2 indicates a second resource allocation for the reception quality information, and wherein the first set of modulation symbols and the second set of modulation symbols include the reception quality information;
map the reception quality information in the first set of modulation symbols or in the second set of modulation symbols onto the uplink resource; and
transmit, to the base station apparatus, a second wireless signal that includes the mapped reception quality information in the first set of modulation symbols or in the second set of modulation symbols, wherein the wireless signal also includes uplink data in a third set of modulation symbols in the uplink resource.

14. The mobile station apparatus according to claim 13, wherein the quantity of the first set of modulation symbols or the quantity of the third set of modulation symbols corresponds to a ratio of a resource amount that can be mapped onto the uplink resource.

15. The mobile station apparatus according to claim 14, wherein the ratio of the resource amount that can be mapped onto the uplink resource is a ratio of a resource amount for mapping the reception quality information onto the uplink resource.

\* \* \* \* \*

UNITED STATES PATENT AND TRADEMARK OFFICE
CERTIFICATE OF CORRECTION

PATENT NO. : 10,181,933 B2
APPLICATION NO. : 14/881897
DATED : January 15, 2019
INVENTOR(S) : Aiba et al.

It is certified that error appears in the above-identified patent and that said Letters Patent is hereby corrected as shown below:

In the Claims

In Column 40, Lines 55-56, Claim 13, delete "a second wireless signal" and insert --a wireless signal--.

Signed and Sealed this
Second Day of April, 2019

Andrei Iancu
*Director of the United States Patent and Trademark Office*